(12) United States Patent
Maemura et al.

(10) Patent No.: US 7,053,795 B2
(45) Date of Patent: May 30, 2006

(54) PARKING ASSISTANCE APPARATUS IN A VEHICLE

(75) Inventors: Takahiro Maemura, Okazaki (JP); Keiji Ueminami, Okazaki (JP); Atsushi Sugahara, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/644,595

(22) Filed: Aug. 20, 2003

(65) Prior Publication Data

US 2004/0119610 A1    Jun. 24, 2004

(30) Foreign Application Priority Data

Aug. 21, 2002   (JP)   ............... 2002-240861

(51) Int. Cl.
*B60Q 1/48* (2006.01)
(52) U.S. Cl. .................. 340/932.2; 340/903; 340/435; 340/937; 348/148
(58) Field of Classification Search ............. 340/932.2, 340/903, 435, 937; 348/148, 149
See application file for complete search history.

(56) References Cited

U.S. PATENT DOCUMENTS

| | | | | |
|---|---|---|---|---|
| 5,646,614 A | * | 7/1997 | Abersfelder et al. | 340/932.2 |
| 6,476,730 B1 | * | 11/2002 | Kakinami et al. | 340/932.2 |
| 6,483,429 B1 | * | 11/2002 | Yasui et al. | 340/435 |
| 6,483,442 B1 | * | 11/2002 | Shimizu et al. | 340/932.2 |
| 6,567,726 B1 | * | 5/2003 | Sakiyama et al. | 701/1 |
| 6,587,760 B1 | * | 7/2003 | Okamoto | 701/1 |
| 6,621,421 B1 | * | 9/2003 | Kuriya et al. | 340/932.2 |
| 6,711,473 B1 | * | 3/2004 | Shimazaki et al. | 701/1 |
| 6,778,891 B1 | * | 8/2004 | Tanaka et al. | 701/41 |

FOREIGN PATENT DOCUMENTS

| | | | |
|---|---|---|---|
| JP | 11208420 A | * | 8/1999 |
| JP | 2000-118334 A | | 4/2000 |
| JP | 2000-335436 A | | 12/2000 |
| JP | 2001-180402 A | | 7/2001 |

* cited by examiner

*Primary Examiner*—Daniel Wu
*Assistant Examiner*—Travis Hunnings
(74) *Attorney, Agent, or Firm*—Rossi, Kimms & McDowell, LLP

(57) ABSTRACT

A parking assistance apparatus for assisting a driver to once stop a vehicle at a predetermined reference position where the driver can view a target parking position in a lateral direction of the vehicle and then to perform parking operation from the reference position to the target parking position. The parking assistance apparatus includes: a camera being installed on the front of the vehicle and configured to capture an image from a side of the vehicle; an image display unit installed in a cabin of the vehicle and configured to display the image captured by the camera; and an image information control unit configured to control image information on the image display unit and to superimpose indicators to guide the vehicle to the reference position on the image.

16 Claims, 19 Drawing Sheets

PARKING ASSISTANCE APPARATUS IN A VEHICLE

BACKGROUND OF THE INVENTION

1. Field of the Invention

This invention relates to a parking assistance apparatus for assisting a driver in parking a vehicle in parallel parking, back-in parking, etc.

2. Background Art

In recent years, a parking assistance apparatus for assisting a driver in parking a vehicle in parallel parking or putting the vehicle in a garage has been developed.

For example, JP-A-2000-118334 discloses an art of assuming that a position having a predetermined positional relationship with the vehicle position when a driver operates a parking assistance switch is a parking position, computing a recommended path from the current position to the parking position, and telling the driver necessary information for running along the recommended path from a loudspeaker by voice.

JP-A-2000-335436 discloses an art wherein as a driver stops a vehicle so that a predetermined mark (a mark put on the inside of a door or a side mirror) becomes a position matching the center line of a garage and turns on a parking assistance switch, automatic steering control is performed from the vehicle stop position to a parking position based on a previously stored move path, thereby assisting the driver in parking the vehicle.

The target parking position is predetermined by the position where the driver operates the parking assistance switch, and a path to the target position used in the apparatus is predetermined. Thus the driver always needs to stop the vehicle at a predetermined position (a reference position) and the predetermined position is determined by the position of a parking stall.

However, the difference of the driving skill in individuals or the difference of the viewpoint to the target parking position because of the different seating position in individuals, it is feared that a deviation between the reference position and the driver's switch operating position may arise. If the deviation in the reference position occurs, the target parking position is shifted and the driver is guided to a different position from the essential target position; this is a problem.

For example, JP-A-2001-180402 discloses an art wherein when a vehicle is backed, a steering start guide is superimposed at the target position in stopping at the steering start position together with an image in the rear of the vehicle provided by a camera on a monitor screen, thereby assisting the driver in parking. Usually, the decision of whether or not an available parking space exists is made by a visual check of the driver when the driver approaches the gateway of the parking space. However, in the art, an indicator is not displayed until the driver backs the vehicle after passing through the gateway of the parking space, the driver cannot decide whether or not the parking space is truly available, and thus the driver feels something is wrong from the usual time and is hard to handle the apparatus.

Since the position of the parking frame as the target is calculated based on an image processing of a white line image captured by the camera, the configuration is complicated. In addition, if the road surface is wet or an obstacle exists on the white line or the white line is hard to recognize because of an adjacent parked vehicle, it is feared that the position of the parking frame as the target will be unable to be precisely calculated. Further, if no white line exists, the position of the parking frame as the target cannot be calculated. Therefore for example, parking assistance cannot be carried out where no white line exists in the parking stall adjacent to a parked vehicle.

SUMMARY OF THE INVENTION

It is therefore an object of the invention to provide a parking assistance apparatus for enabling the driver to easily stop his or her vehicle at a reference position and further enabling the driver to easily determine whether or not the area for the driver to park the vehicle contains a space in which the vehicle can be parked, thereby assisting the driver in parking appropriately.

To achieve the object, the invention provide a parking assistance apparatus for assisting a driver to once stop a vehicle at a predetermined reference position where the driver can view a target parking position in a lateral direction of the vehicle and then to perform parking operation from the reference position to the target parking position. The parking assistance apparatus includes: a camera being installed on the front of the vehicle and configured to capture an image from a side of the vehicle; an image display unit installed in a cabin of the vehicle and configured to display the image captured by the camera; and an image information control unit configured to control image information on the image display unit and to superimpose indicators to guide the vehicle to the reference position on the image.

The invention may provide a parking assistance method for assisting a driver to once stop a vehicle at a predetermined reference position where the driver can view a target parking position in a lateral direction of the vehicle and then to perform parking operation from the reference position to the target parking position. The parking assistance method includes: capturing an image viewed from a side of the vehicle; and displaying the image to the driver, while superimposing indicators to guide the vehicle to the reference position on the image.

The invention may provide a vehicle including the parking assistance apparatus.

BRIEF DESCRIPTION OF THE DRAWINGS

The present invention may be more readily described with reference to the accompanying drawings, in which.

DETAILED DESCRIPTION OF THE PREFERRED EMBODIMENTS

Referring now to the accompanying drawings, there are shown preferred embodiments of the invention.

[1] First Embodiment

Figure 1:
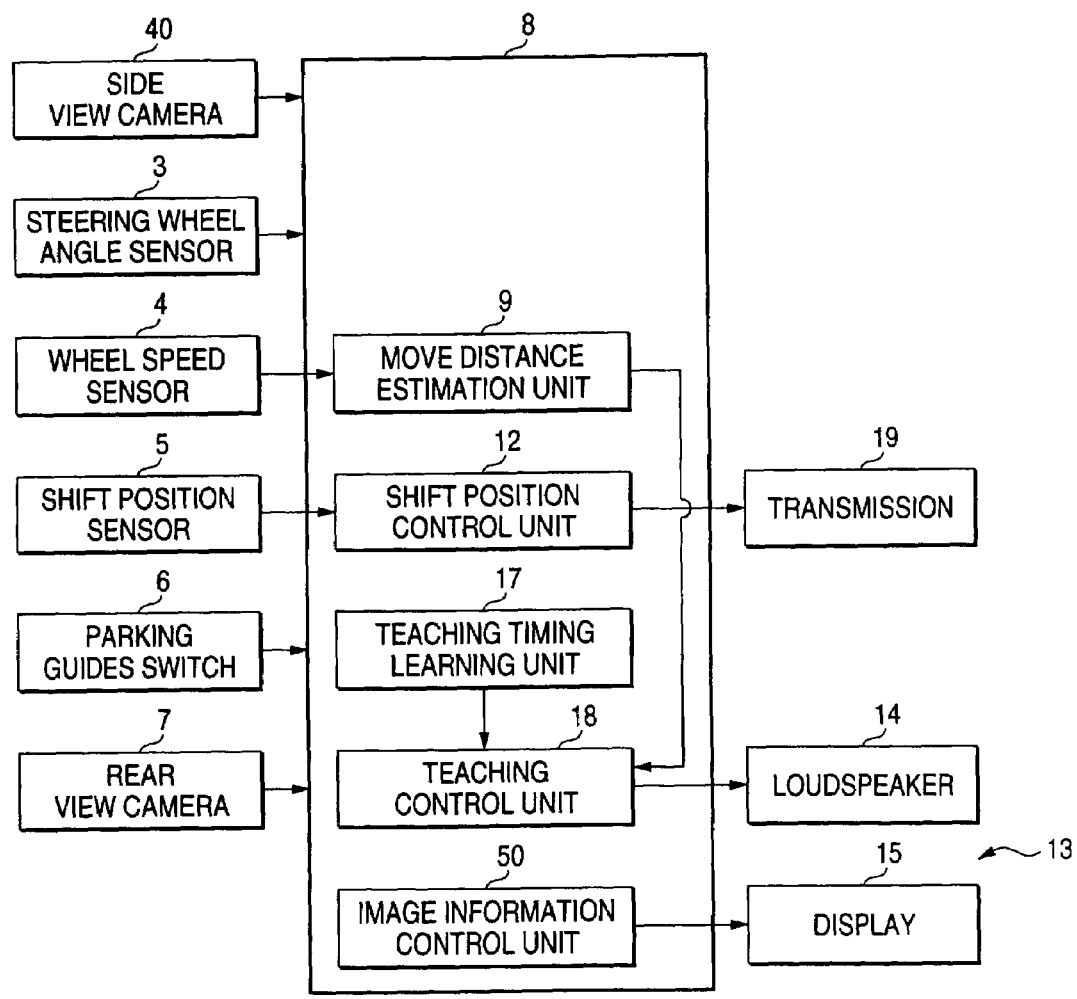
FIG. 1 is a block diagram to show a schematic configuration of a parking assistance apparatus as a first embodiment of the invention.

As shown in FIG. 1, the parking assistance apparatus of the embodiment includes a steering wheel angle sensor 3 as a steering angle detection unit, a wheel speed sensor 4, a shift position sensor 5 as a shift position detection unit, a parking guide switch 6 as an instruction unit, a rear view camera 7, side view cameras (cameras) 40, an ECU (electronic control unit) 8, a teaching unit 13, and a display 15 as image display unit.

The steering wheel angle sensor 3 detects the steering angle of a steering wheel, whereby steering angle position information to teach the driver whether or not the steering angle of a vehicle 1 becomes a predetermined steering angle can be provided.

The wheel speed sensor 4 detects the rotation speed of a wheel (not shown), and moving distance information of the vehicle can be provided based on the rotation speed and the circumference of the wheel.

The shift position sensor 5 detects the selected shift stage; it can be used to determine whether the speed detected by the wheel speed sensor 4 corresponds to forward travel or reverse travel, can be used to check whether or not the driver responds to the guide with correct operation, and can be used to control the shift stage.

The parking guide switch 6 is placed in the proximity of a driver seat where the driver easily operates the switch. The driver can turn on the parking assistance apparatus (namely, give a parking assistance start instruction) and turn off the parking assistance apparatus by operating the parking guide switch 6.

The driver can also select a parking assistance mode by operating the parking guide switch 6; the driver can select necessary parking assistance from among "left parallel parking," "right parallel parking," "left back-in parking," and "right back-in parking."

When the driver gives a parking assistance start instruction by operating the parking guide switch 6, indicators 41 can be displayed on an image captured by the side view camera 40.

The rear view camera 7 is placed at the rear end of the vehicle 1 for capturing an image of the circumstances in the rear of the vehicle 1. The image captured by the rear view camera 7 is displayed on the display 15 installed in the cabin, whereby the driver can recognize the circumstances in the rear of the vehicle 1.

Figure 2:
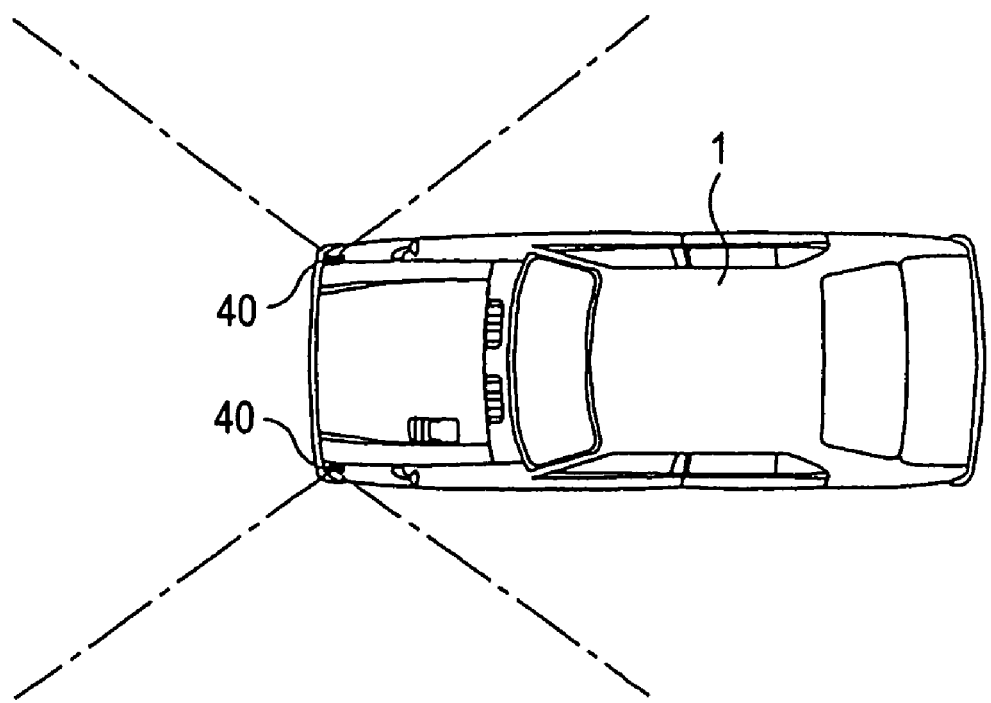
FIG. 2 is a plan view to show the image pickup range of cameras according to the first embodiment of the invention.

One of the features of the parking assistance apparatus is that the side view cameras 40 each for capturing a view image of a side of the vehicle 1 are installed on the left and right sides of the front of the vehicle 1 as shown in FIG. 2 in addition to the rear view camera 7.

Therefore, for example, if the driver selects "left parallel parking" or "left back-in parking" by operating the parking guide switch 6, the view image picked by the side view camera 40 on the left front of the vehicle 1 (namely, left side view of the vehicle 1) is displayed on the display 15; if the driver selects "right parallel parking" or "right back-in parking" by operating the parking guide switch 6, the view image picked by the side view camera 40 on the right front of the vehicle 1 (namely, right side view of the vehicle 1) is displayed on the display 15. Since a wide angle camera is used as each side view camera 40 and the distortion occurs in the image, it is preferable to remove the distortion from the image for driver to see the image easily.

Thus, in the parking assistance apparatus, the side view cameras 40 for capturing images of sides of the vehicle 1 are placed on the left and right sides of the front of the vehicle 1. However, for example, a camera unit for capturing images of the left and right sides of the vehicle 1 (not shown) may be placed at one point of the front end of the vehicle 1 and may be changed appropriately in the image pickup direction so as to capture an image of the left side of the vehicle 1 if the driver selects left assistance by operating the parking guide switch 6 and an image of the right side of the vehicle 1 if the driver selects right assistance. In doing so, only one camera needs to be used and thus the manufacturing cost can be reduced.

By the way, the parking assistance apparatus requests the driver to once stop the vehicle 1 at a nearby position (reference position) of an area to park the vehicle (target parking position), and then assists the driver in parking from the reference position to the target parking position along a predetermined path.

Therefore, to park the vehicle without deviating from the target parking position, the driver needs to precisely stop the vehicle 1 at the reference position.

Then, the parking assistance apparatus is provided with an image information control unit 50 (see FIG. 1) for superimposing indicators 41 to guide the vehicle 1 to the reference position on the image of the side view camera 40 on the display 15 when the driver turns on the parking guide switch 6. The driver can easily and precisely stop the vehicle 1 at the reference position by driving the vehicle 1 based on the indicators 41 superimposed on the image on the display by the image information control unit 50.

Figure 3A:
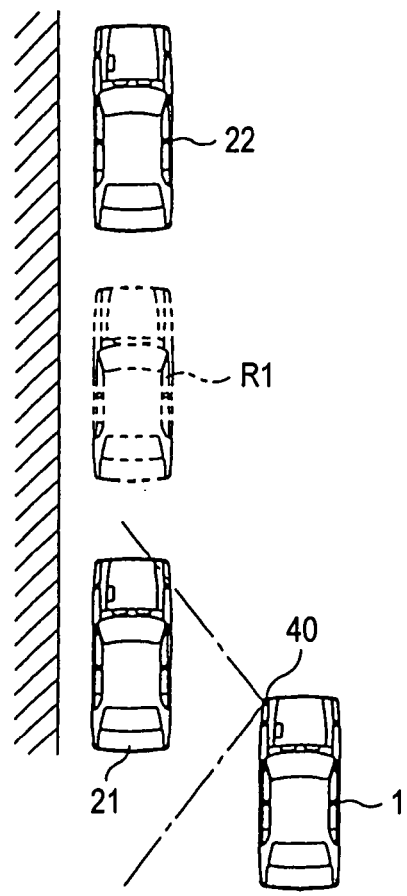
FIG. 3A is a plan view to describe parking assistance in parallel parking according to the first embodiment of the invention.
Figure 3B:
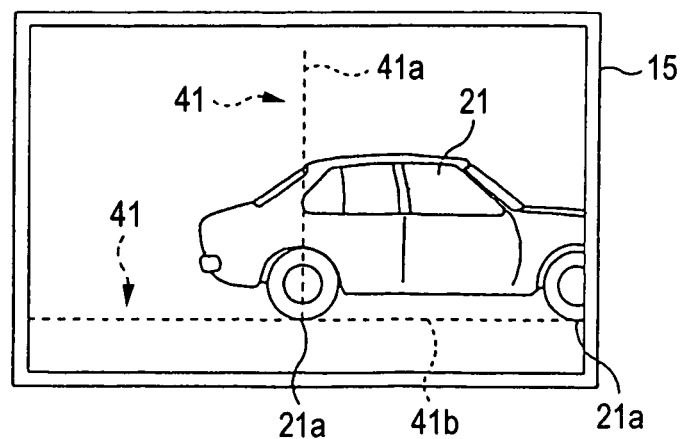
FIG. 3B is a schematic drawing to show a display screen displaying an image captured by a camera and indicators at the position of a vehicle shown in FIG. 3A.

For example, if the driver operates the parking guide switch 6 for selecting "left parallel parking" at the position of the vehicle 1 shown in FIG. 3A, the image captured by the side view camera 40 (here, left side view of the vehicle 1) is displayed on the display 15 as shown in FIG. 3B.

At this time, the image information control unit 50 fixedly superimposes the indicators 41 at the same time as the image. The indicators 41 include a vertical line 41a and a horizontal line 41b.

The vertical line 41a, for example, is displayed at the center in the display 15 and is used as a guideline for positioning the vehicle 1 in the longitudinal direction thereof. The vertical line 41a is also called a longitudinal direction guideline.

That is, the driver can position the vehicle 1 in the longitudinal direction thereof by driving the vehicle 1 longitudinal so that the vertical line 41a overlaps an object.

On the other hand, the horizontal line 41b is displayed on the lower side in the display 15 and is used as a guideline for positioning the vehicle 1 in the lateral direction thereof (vehicle width direction). The horizontal line 41b is also called lateral direction guideline.

For example, by driving the vehicle 1 to overlap the horizontal line 41b and the tire ground contact positions 21a, 21a of the parked vehicle 21, the driver can position the vehicle 1 at a predetermined distance from the parked, as shown in FIG. 3B. FIG. 3B shows the case where the tire placement positions 21a, 21a of the parked vehicle 21 overlap the horizontal line 41b.

When the tire ground contact positions 21a, 21a of the parked vehicle 21 are above the horizontal line 41b on the display 15, the vehicle 1 is at a more distant position from the predetermined distance from the parked vehicle 21; when the tire ground contact positions 21a and 21a of the parked vehicle 21 are below the horizontal line 41b, the vehicle 1 is at a closer position to the parked vehicle 21 from the predetermined distance from the parked vehicle 21.

Thus, the vehicle 1 can be positioned in the longitudinal direction relative to the parked vehicle 21 based on the vertical line 41a and can be positioned in the lateral direction relative to the parked vehicle 21 based on the horizontal line 41b.

Figure 4A:
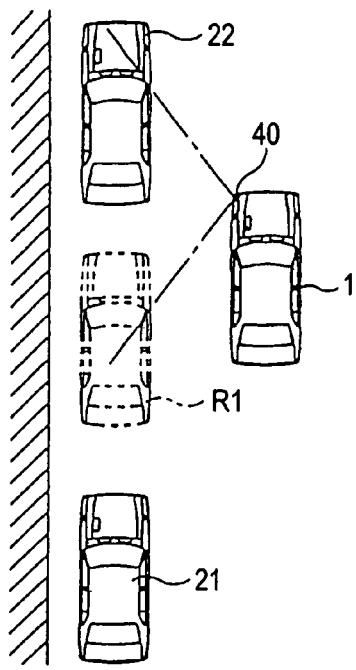
FIG. 4A is a plan view to describe parking assistance in parallel parking according to the first embodiment of the invention.
Figure 4B:
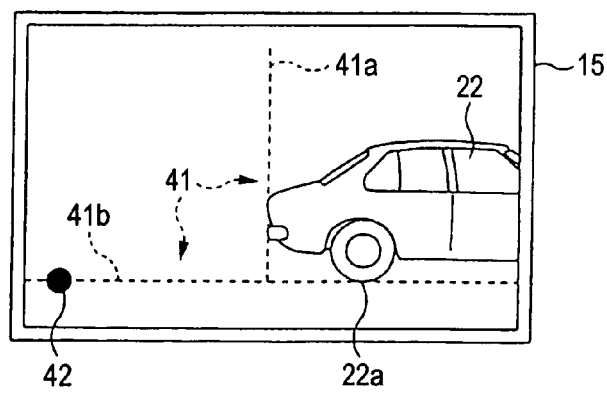
FIGS. 4B and 4C are schematic drawing to show a display screen displaying an image captured by the camera and indicators at the position of the vehicle shown in FIG. 4A.

Therefore, if the reference position is set as the position where the vertical line 41a overlaps the rear end of a parked vehicle 22 at the downstream side of parking area R1 and the horizontal line 41b overlaps a tire ground contact position 22a of the parked vehicle 22 as shown in FIGS. 4A and 4B, and the driver stops the vehicle 1 at the reference position and presses the parking switch 6 to recognize as the vehicle 1 is in the reference position, the driver can receive parking instruction from the reference position to the target parking position in teaching.

Figure 5A:
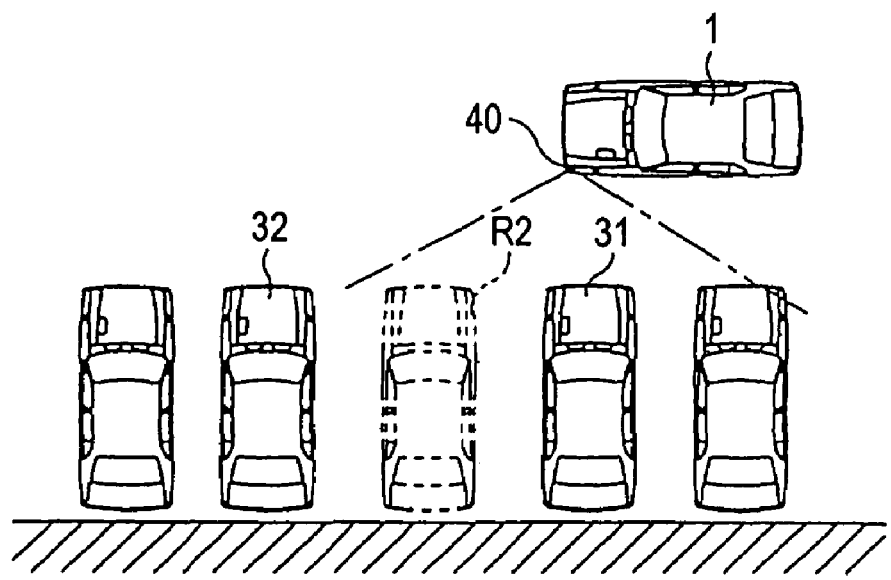
FIG. 5A is a plan view to describe parking assistance in back-in parking according to the first embodiment of the invention.
Figure 5B:
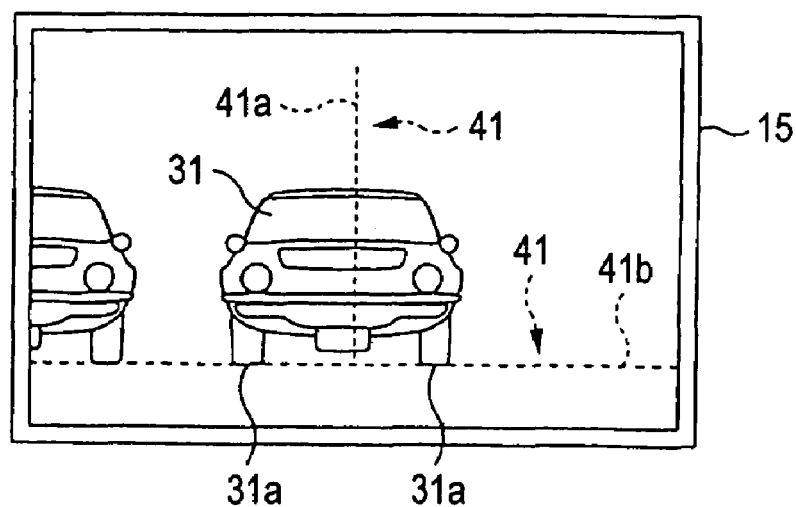
FIG. 5B is a schematic drawing to show a display screen displaying an image captured by the camera and indicators at the position of the vehicle shown in FIG. 5A.

On the other hand, if the driver operates the parking guide switch 6 for selecting "left back-in parking" at the position of the vehicle 1 shown in FIG. 5A, as shown in FIG. 5B, the image captured by the side view camera 40 (here, left side view of the vehicle 1) is displayed on the display 15 and the vertical line 41a and the horizontal line 41b are fixedly superimposed on the image by the image information control unit 50. FIG. 5B shows the case where tire placement positions 31a and 31a of an upstream vehicle 31 overlap the horizontal line 41b.

Therefore, if the reference position is set as the position where the vertical line 41a overlaps the rear end of a parked vehicle 32 at the downstream side of parking area R1 and the horizontal line 41b overlaps a tire ground contact position 32a of the parked vehicle 32 as shown in FIGS. 4A and 4B, and the driver stops the vehicle 1 at the reference position and presses the parking switch 6 to recognize as the vehicle 1 is in the reference position, the driver can receive parking instruction from the reference position to the target parking position in teaching.

In the description given above, a parked vehicle is used as the object on which the indicators 41 are superimposed, but when a parking stall line, a wall, and the like exist, they may be used as the object on which the indicators 41 are superimposed.

Accordingly, if a parked vehicle exists at the downstream side of the area R1, R2 for the driver to park the vehicle 1, the vehicle 1 can be easily stopped at the reference position.

Parallel parking assistance and back-in parking assistance differ in assistance (teaching) contents in parking from the reference position to the target parking position for the driver and also differ in reference position and differ in positions of the indicators 41 displayed on the display 15, of course.

That is, generally, the vehicle 1 can be brought closer to a parked vehicle in parallel parking as compared with back-in parking and therefore considering this fact, the horizontal line for parallel parking assistance (lateral direction guideline for parallel parking) is fixedly superimposed below the position of the horizontal line for back-in parking assistance (lateral direction guideline for back-in parking).

Figure 6A:
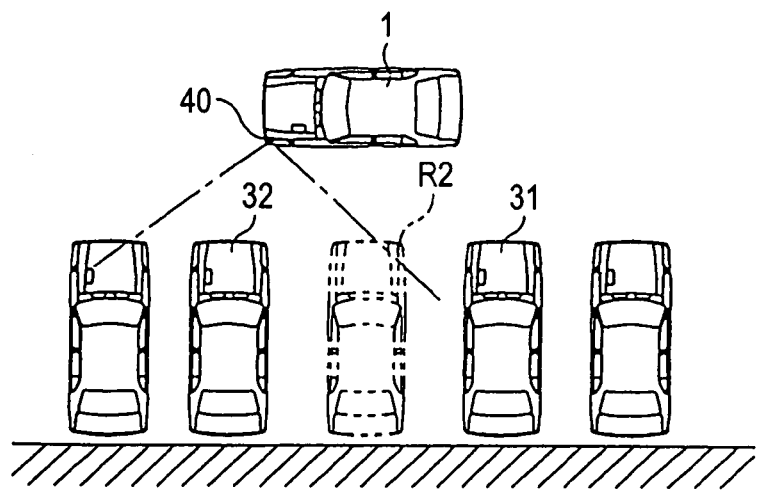
FIG. 6A is a plan view to describe parking assistance in back-in parking according to the first embodiment of the invention.
Figure 6B:
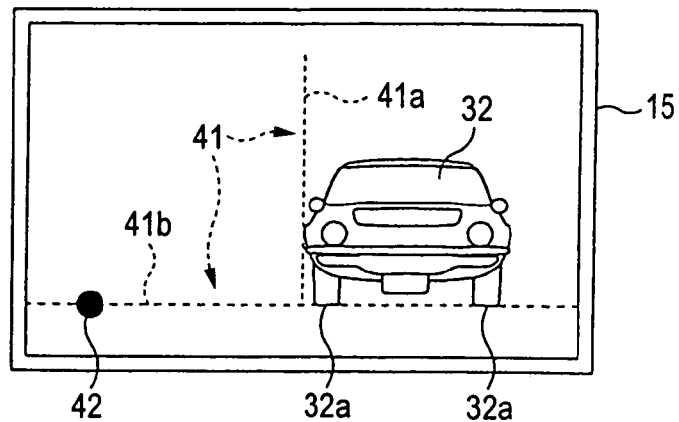
FIGS. 6B and 6C are schematic drawings to show a display screen displaying an image captured by the camera and indicators at the position of the vehicle shown in FIG. 6A.

As shown in FIGS. 4B and 6B, a mark 42 displayed on the horizontal line 41b indicates an expected center position of the vehicle 1 at the completion time of parking. Accordingly, the driver can previously recognize the position of the vehicle within a parking area at the completion of parking on the display 15.

Figure 4C:
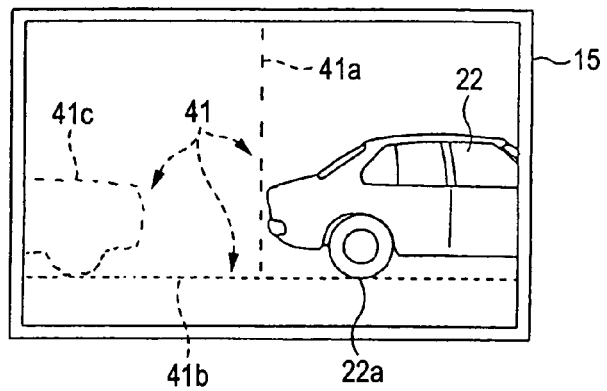
Figure 6C:
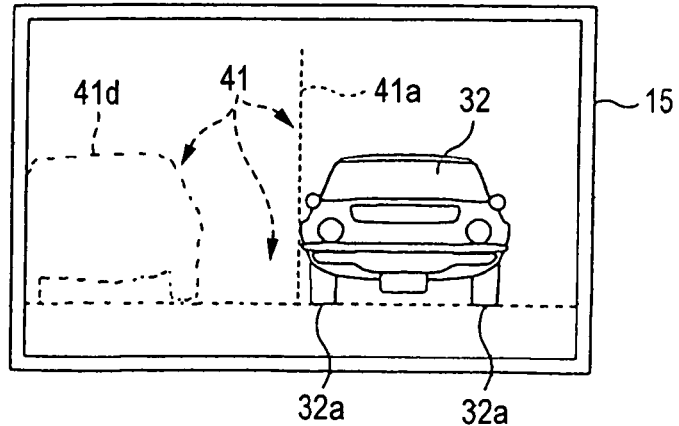

Indicators 41c (in parallel parking) and 41d (in back-in parking) schematically representing the vehicle 1 in parking may be additionally displayed as shown in FIGS. 4C and 6C. As the indicator 41c or 41d is displayed, the driver can easily grasp the position of the vehicle 1 at the completion of parking and can previously check on the display 15 whether or not the vehicle 1 and its adjacent vehicle or obstacle are at proper positions at the completion of parking. Therefore, the driver can use the indicator 41c, 41d to stop the vehicle 1 at the reference position. In the examples in FIGS. 4C and 6C, the vertical line 41a and the horizontal line 41b for parallel parking and the vertical line 41a and the horizontal line 32a for back-in parking are displayed together with the indicators 41c and 41d schematically representing the vehicle 1, but either or both of the vertical line 41a and the horizontal line 41b, 32a may be omitted.

As shown in FIG. 1, the ECU 8 includes functions equivalent to a moving distance estimation unit 9, a shift position control unit 12, a teaching timing learning unit 17, and teaching control unit 18 in addition to the image information control unit 50.

The moving distance estimation unit 9 estimates the moving distance of the vehicle 1 from the rotation speed of the wheel detected by the wheel speed sensor 4 and the circumference of the wheel.

The shift position control unit 12 functions so as to limit the shift position of a transmission 19 to the first gear while the driver is taught driving operation for parking assistance. Accordingly, the vehicle 1 can be run while it is kept at low speed, and the driver can do parallel parking or back-in parking safely and easily under running.

The teaching timing learning unit 17 learns the stop teaching timing of the teaching unit 13 described later based on the reaction time of the driver.

The teaching control unit 18 controls the teaching contents and the teaching timing of the teaching unit 13 described later and provides the appropriate teaching contents for the driver at the appropriate timing during parking operation.

Figure 7:
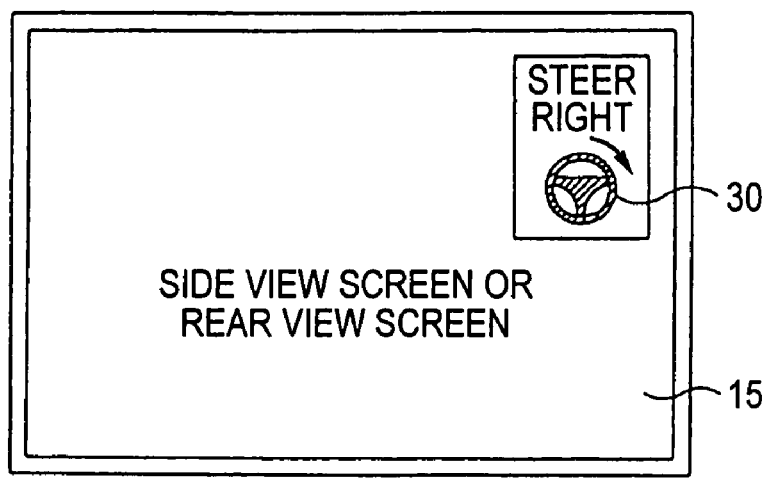
FIG. 7 is a schematic drawing to describe image display unit according to the first embodiment of the invention.
Figure 8:
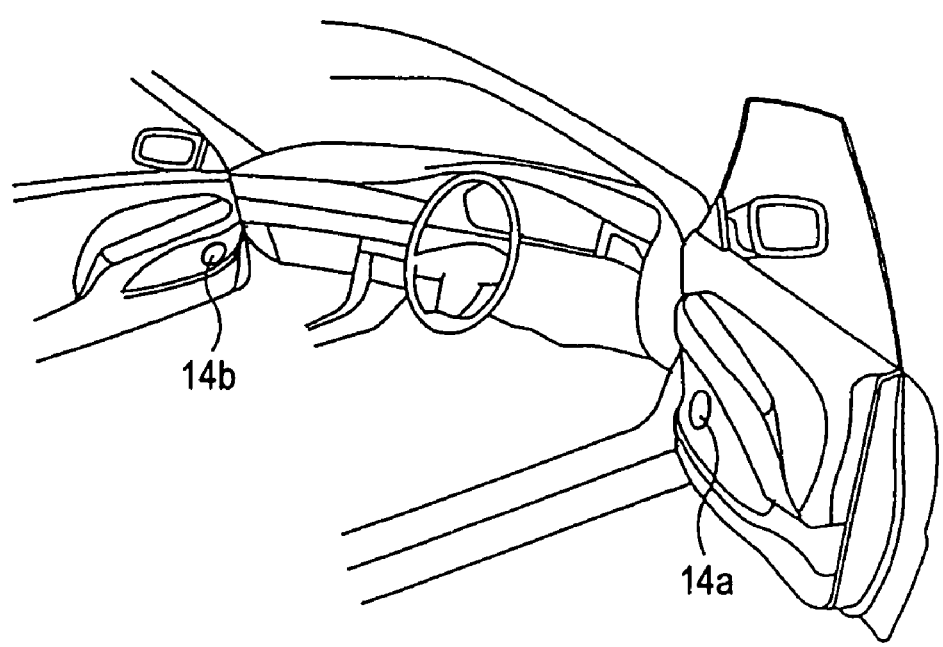
FIG. 8 is a schematic drawing to describe loudspeakers according to the first embodiment of the invention.

The teaching unit 13 includes the display 15 and loudspeakers 14a and 14b as shown in FIGS. 7 and 8 for guiding the driver through driving so that the vehicle 1 runs on a predetermined path from the reference position to the target parking position; it teaches the driver to move the vehicle 1 forward or reverse and stop the vehicle and further teaches the driver the turning direction of the steering wheel.

Specifically, as shown in FIG. 7, the image captured by the side view camera 40 is displayed on the display 15 and the indicators 41 are superimposed on the image of the side view camera 40 by the image information control unit 50 until the vehicle 1 stops at the reference position after the parking guide switch 6 is turned on.

Upon completion of stopping the vehicle 1 at the reference position, then an icon 30 of the steering wheel is displayed at the upper right corner of the screen, for example, together with the image captured by the rear view camera 7, and a right arrow (steering to the right) or a left arrow (steering to the left) is displayed above the icon 30 of the steering wheel so that the driver can understand which direction the driver may steer in.

A guide beep sound is produced and a voice message of "slowly move forward about 1 meter," "steer fully to the left," or the like is issued through the loudspeakers 14a and 14b shown in FIG. 8.

Therefore, the driver can handle the steering wheel and move the vehicle 1 forward or reversely to bring the vehicle 1 accurately into the target parking position as the driver is taught the way from the loudspeakers 14a and 14b and the display 15. Of course, the driver can be sufficiently taught the way from the loudspeaker 14 only.

Since the parking assistance apparatus in the first embodiment of the invention is thus configured, parking assistance for parallel parking and back-in parking is performed according to the following procedures:

[1-A] Parking Assistance of Parallel Parking

Parking assistance of left parallel parking will be discussed with FIGS. 3A, 3B, 4A, 4B, 9, and 10.

Figure 9:
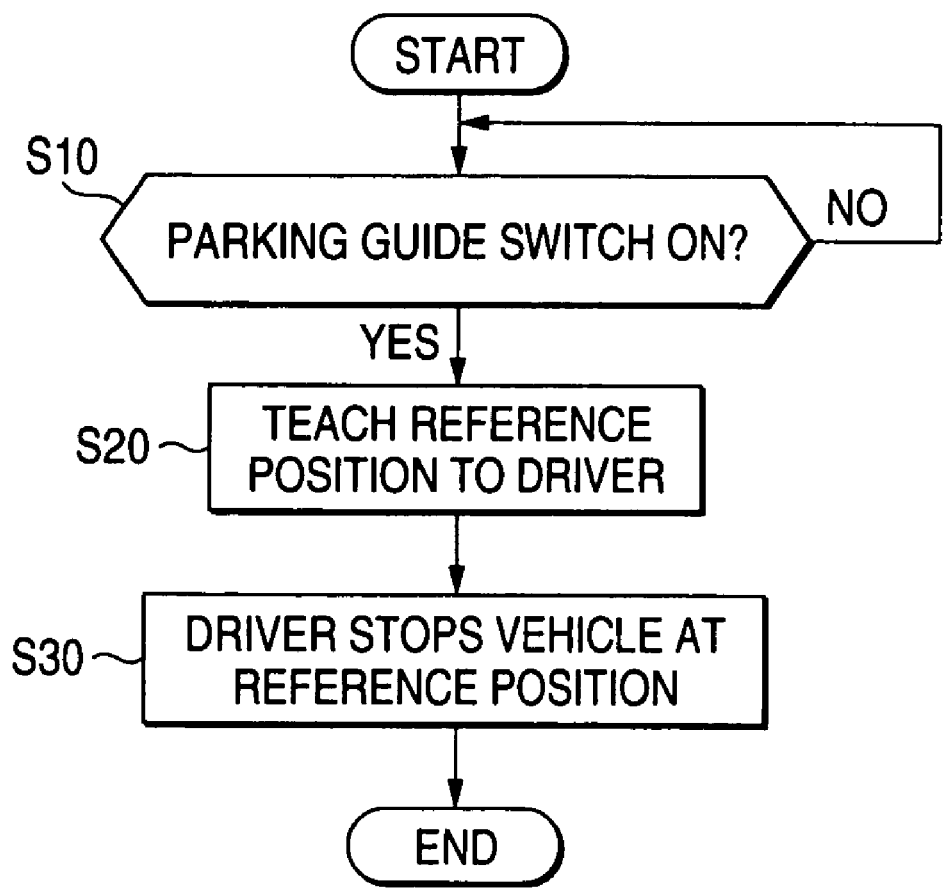
FIG. 9 is a flowchart to describe parking assistance in parallel parking and back-in parking according to the first embodiment of the invention.

As shown in FIG. 3A, to do left parallel parking when there are parked vehicles 21 and 22 at the upstream side and the downstream side of the area R1 for the driver to park the vehicle 1, for example, the driver turns on the parking guide switch 6 at the upstream right of the area R1 for the driver to park the vehicle 1 (position of the vehicle 1 shown in FIG. 3A) to select "left parallel parking" (step S10 in FIG. 9).

When the driver turns on the parking guide switch 6, the image captured by the side view camera 40 and the indicators 41 for parallel parking are displayed on the display 15 in the vehicle compartment as shown in FIG. 3B, and a voice message of "stop the vehicle at the position where the vertical line matches the rear-end of the vehicle that is ahead of your vehicle while matching the horizontal line in the screen with the tire ground contact positions of the vehicle" is given to the driver (step S20 in FIG. 9).

While seeing the display 15, the driver brings the vehicle 1 into the reference position by driving the vehicle 1 so that the vertical line 41a overlaps the rear end of the vehicle 22 that is ahead of the vehicle 1 and that the horizontal line 41b overlaps the tire ground contact positions of the vehicle 22.

That is, if the horizontal line 41b overlaps the tire ground contact position 22a of the vehicle 22 and the vertical line 41a overlaps the rear end of the vehicle 22 on the display 15 as shown in FIG. 4B, the vehicle 1 is stopped at the position as shown in FIG. 4A (step S30 in FIG. 9). The vehicle stop position at this time is the reference position.

As shown in FIG. 4B, the mark 42 is displayed on the horizontal line 41b, when the vehicle 1 stops at the reference position. The mark 42 indicates an expected center position of the vehicle 1 at the completion time of parking. Accordingly, the driver can recognize the position of the vehicle 1 within a parking area at the completion time of parking on the display 15.

Figure 10:
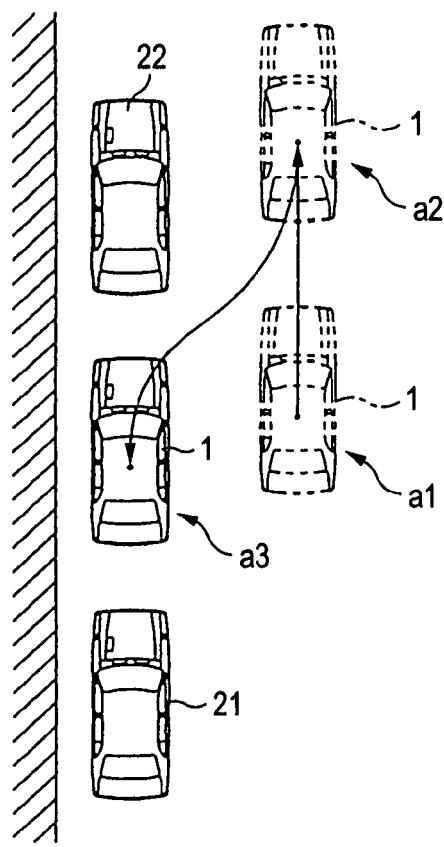
FIG. 10 is a drawing to describe the parking assistance apparatus as the first embodiment of the invention and is a plan view to describe operation for parallel parking from reference position to target parking position.

By the way, to do parallel parking, as shown in FIG. 10, first the driver moves the vehicle 1 forward a predetermined distance from a reference position a1 and stops the vehicle 1 at an initial vehicle stop position a2 and then backs the vehicle 1 toward a target parking position a3. The driver turns the steering wheel to the direction of the target parking position a3 before starting of the backing operation. Then the driver backs the vehicle 1 in the steered state. When the rear of the vehicle 1 is turned in the required direction (first back turn), the driver turns the steering wheel to a neutral position and further backs the vehicle 1 (neutral back). Finally, the driver turns the steering wheel to the opposite direction and then backs the vehicle 1 to the target parking position a3 so as to adjust the direction of the vehicle 1 (second back turn).

In the embodiment, necessary moving distance (predetermined distance) D1 from the current position (reference position) a1 of the vehicle 1 to the forward travel position (initial vehicle stop position) a2 and further first back turn distance Db1, neutral back distance Dc, and second back turn distance Db2 from the initial vehicle stop position a2 to the target parking position a3 are predetermined. Therefore, the target parking position a3 is inevitably determined if the reference position a1 is determined.

The parking assistance of left parallel parking is conducted according to the described procedure. The procedure of parking assistance of right parallel parking is similar to that of the parking assistance of left parallel parking except for turning direction of steering wheel, which is opposite.

In the description given above, there are parked vehicles 21 and 22 at the upstream side and the downstream side of the area R1 for the driver to park the vehicle 1; if there is only the parked vehicle 22 at the downstream side, the driver can stop the vehicle 1 at the reference position in a similar manner to that described above.

If only the parked vehicle 21 at the upstream side exists, the driver stops the vehicle 1 at a forward position of the full length of the vehicle 1 or more from the parked vehicle 21 and again presses the parking guide switch 6 at the stop position, whereby the position can be set as the reference position.

Further, if the parked vehicles 21 and 22 do not exist, the driver stops the vehicle 1 at a proper position by visual inspection and again presses the parking guide switch 6 at the stop position, whereby the position can be set as the reference position.

[1-B] Parking Assistance of Back-In Parking

Parking assistance of left back-in parking will be discussed with FIGS. 5A, 5B, 6A, 6B, 9, and 11.

As shown in FIG. 5A, to do left back-in parking when there are parked vehicles 31 and 32 at the right (upstream side) and the left (back) of the area R2 for the driver to park the vehicle 1, for example, the driver turns on the parking guide switch 6 at the upstream right of the area R2 for the driver to park the vehicle 1 (position of the vehicle 1 shown in FIG. 5A) to select "left back-in parking" (step S10 in FIG. 9).

When the driver turns on the parking guide switch 6, the image captured by the side view camera 40 and the indicators 41 for back-in parking are displayed on the display 15 in the cabin as shown in FIG. 5B, and a voice message of "stop the vehicle at the position where the vertical line matches the right side face of the vehicle ahead your vehicle while matching the horizontal line in the screen with the tire ground contact positions of the vehicle ahead your vehicle" is given to the driver (step S20 in FIG. 9).

While seeing the display 15, the driver brings the vehicle 1 into the reference position by driving the vehicle 1 so that the vertical line 41a may overlap the right side face (right end) of the vehicle 32 that is ahead of the vehicle 1 and that the horizontal line 41b may overlap the tire ground contact positions of the vehicle 32.

That is, if the driver stops the vehicle 1 at the position where the horizontal line 41b overlaps the tire ground contact positions 32a and 32a of the vehicle 32 ahead the vehicle 1 and the vertical line 41a overlaps the right end of the vehicle 32 ahead the vehicle 1 on the display 15 as shown in FIG. 6B, the vehicle 1 will stop at the position as shown in FIG. 5A (step S30 in FIG. 9). The vehicle stop position at this time is the reference position.

When the vehicle 1 stops at the reference position, the mark 42 is displayed on the horizontal line 41b as shown in FIG. 4B. The mark indicates the center position of the vehicle 1 at the completion of parking of the vehicle 1. Accordingly, the driver can recognize the position of the vehicle 1 within a parking area at the completion of parking 1 on the display 15.

Figure 11:
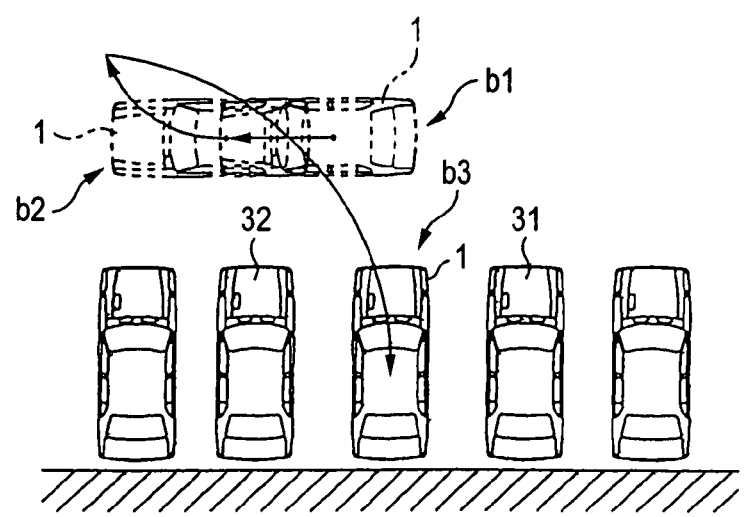
FIG. 11 is a drawing to describe the parking assistance apparatus as the first embodiment of the invention and is a plan view to describe operation for back-in parking from reference position to target parking position.

By the way, to do back-in parking, as shown in FIG. 11, first the driver moves the vehicle 1 forward a predetermined distance from a reference position b1 and stops the vehicle 1 at an initial vehicle stop position b2.

To move the vehicle 1 from the initial vehicle stop position b2 to a target parking position b3, first the driver turns the steering wheel so that the rear of the vehicle 1 may be turned in the direction of the target parking position b3.

Then the driver moves the vehicle 1 forward in the steered state. When the vehicle 1 reaches a predetermined position, the driver turns the steering wheel to the opposite direction and backs the vehicle 1 to the target parking position.

In the embodiment, necessary moving distance (predetermined distance) D2 from the current position (reference position) b1 of the vehicle 1 to the forward travel position (initial vehicle stop position) b2 and further forward turn distance Df and back turn distance Db3 from the initial vehicle stop position b2 to the target parking position b3 are predetermined. Therefore, the target parking position b3 is inevitably determined if the reference position b1 is determined.

The parking assistance of left back-in parking is conducted according to the described procedure. The procedure of parking assistance of right back-in parking is similar to that of the parking assistance of left back-in parking except that the driver steers in the opposite direction.

In the description given above, there are parked vehicles 31 and 32 at the upstream side and the downstream side of the area R2 for the driver to park the vehicle 1; if there is only the parked vehicle 32 at the downstream side, the driver can stop the vehicle 1 at the reference position in a similar manner to that described above.

If there is only the parked vehicle 31 at the upstream side, the driver stops the vehicle 1 at a forward position of the full width of the vehicle 1 or more from the parked vehicle 31 and again presses the parking guide switch 6 at the stop position, whereby the position can be set as the reference position.

Further, if the parked vehicles 31 and 32 do not exist, the driver stops the vehicle 1 at a proper position by visual inspection and again presses the parking guide switch 6 at the stop position, whereby the position can be set as the reference position.

The parking assistance apparatus assists the driver in parking the vehicle in parallel parking and back-in parking as described above. While the apparatus assists the driver in parking, the shift position control unit 12 limits the shift stage of the transmission 19 to the first gear. Therefore, if the driver presses down the throttle pedal unintentionally during driving, the driver can do safe parallel parking or back-in parking at very low speed.

Further, the teaching timing learning unit 17 learns the teaching timing of stop based on the reaction time of the driver and the teaching control unit 18 corrects the teaching timing of stop based on learning of the teaching timing learning unit 17. Thus, considering the driver's reaction time (for example, sensing the rising time of brake pressure), when the vehicle 1 comes to a position of a predetermined time the stop position (for example, 0.8 seconds to the stop position), a guide sound and a voice message teaching the driver to stop the vehicle are output. Therefore, the driver can receive more natural parking assistance.

While the driver is assisted in parking from the initial vehicle stop position to the target parking position, the image captured by the rear view camera 7 and the driving operation are displayed on the display 15. Thus, particularly when backing the vehicle 1, the driver can know the necessary steering wheel operation while checking the circumstances in the rear of the vehicle 1. Therefore, the driver can perform safe and accurate driving operation.

When the driver uses the indicators 43c, 43d that schematically representing the parked state of the vehicle 1, taking the parallel parking mode as an example, a voice message is sent to the driver so as to stop the vehicle 1 at the position where the front end of the indicator 41c is spaced at a predetermined interval from the rear end of the parked vehicle 22 while adapting the tire placement level of the indicator 41c to that of the parked vehicle 21 in the screen. Accordingly, the driver can be assisted in parking with good accuracy.

As described above, the parking assistance apparatus enables the driver to easily and precisely stop the vehicle 1 at the reference position by driving the vehicle 1 while seeing the indicators 41 superimposed on the image on the display 15. Accordingly, the deviation between the vehicle 1 and the reference position is decreased, so that the driver can park the vehicle 1 at the target parking position with better accuracy.

As the driver starts left or right parking assistance by operating the parking guide switch 6, the image corresponding to the selected side of the vehicle 1 is displayed on the display 15, so that the image on the parking side can be accurately provided for the driver.

The driver can position the vehicle 1 in the longitudinal direction thereof based on the vertical line 41a and can position the vehicle 1 in the lateral direction thereof based on the horizontal line 41b, so that the driver can stop the vehicle 1 at the reference position a1 with better accuracy.

There are the horizontal line 41b for parallel parking and the horizontal line 41b for back-in parking. When the driver selects parallel parking assistance by operating the parking guide switch 6, the horizontal line 41b for parallel parking is displayed. When the driver selects back-in parking assistance by operating the parking guide switch 6, the horizontal line 41b for back-in parking is displayed. Thus, the parking assistance apparatus can assist the driver in parallel parking and back-in parking with better accuracy.

[2] Second Embodiment

Parts identical with those of the parking assistance apparatus of the first embodiment previously described with reference to the accompanying drawings are denoted by the same reference numerals in FIGS. 12 to 15.

The parking assistance apparatus of the second embodiment differs from that of the first embodiment in indicators displayed on display 15 by image information control unit 50. Therefore, indicators according to the parking assistance apparatus of the second embodiment will be discussed in detail.

Figure 12B:
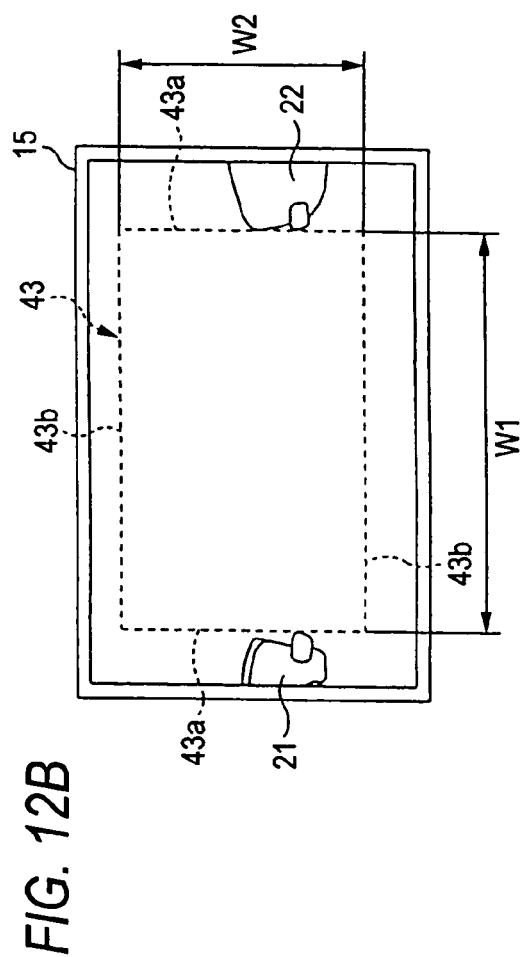
FIGS. 12B and 12C are schematic drawings to show a display screen displaying an image captured by a camera and indicators at the position of the vehicle shown in FIG. 12A.

As shown in FIG. 12B, indicators 43 according to the parking assistance apparatus form a frame (quadrangle) and include left and right vertical lines (longitudinal direction guidelines) 43a and 43a and top and bottom horizontal lines 43b and 43b. The left vertical line 43a and the right vertical line 43a are guidelines used for positioning the vehicle 1 in the longitudinal direction thereof (longitudinal direction guidelines), and the bottom horizontal line 43b is a guideline used for positioning the vehicle 1 in the lateral direction thereof (vehicle width direction) (lateral direction guideline).

If the driver selects parallel parking assistance by operating a parking guide switch 6, a width W1 between the left vertical line 43a and the right vertical line 43a is displayed so as to become the width corresponding to the length longer than the full length of the vehicle 1 by a predetermined value, as shown in FIG. 12B. A width W2 between the top horizontal line 43b and the bottom horizontal line 43b is displayed so as to become the width corresponding to the height of the vehicle 1 or the width corresponding to the width longer than the height of the vehicle 1 by a predetermined value.

Figure 14A:
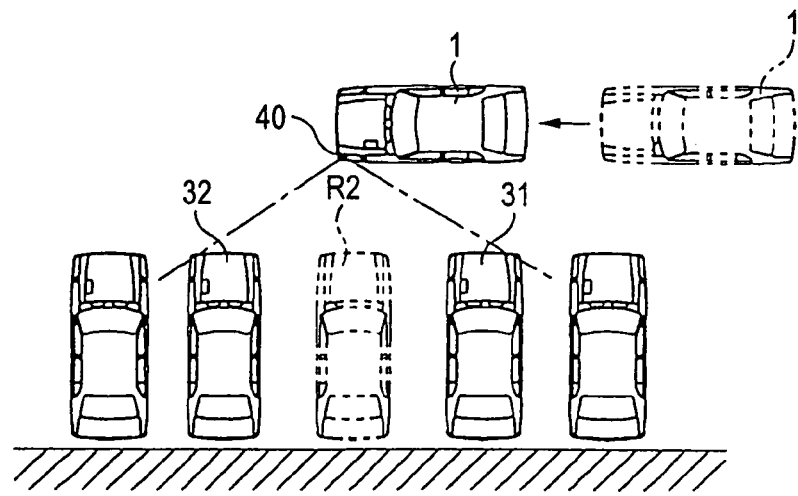
FIG. 14A is a plan view to describe parking assistance in back-in parking according to the second embodiment of the invention.
Figure 14B:
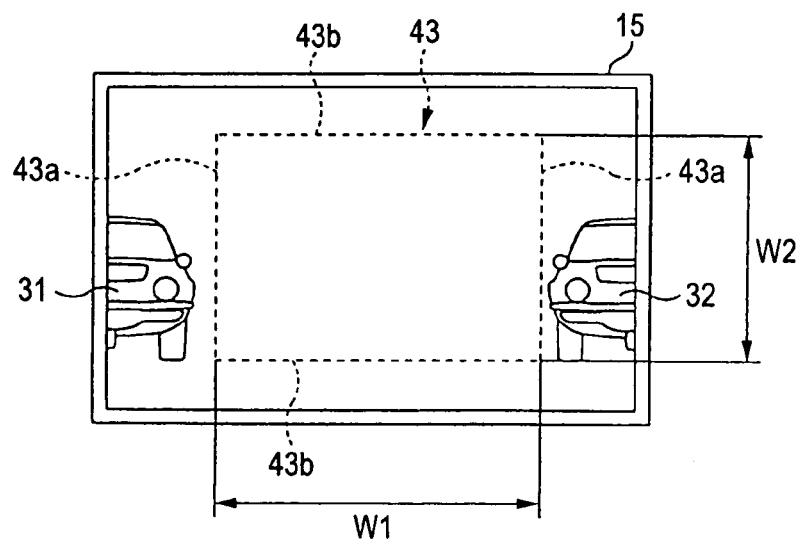
FIGS. 14B and 14C are schematic drawings to show a display screen displaying an image captured by the camera and indicators at the position of the vehicle shown in FIG. 14A.

On the other hand, if the driver selects back-in parking assistance by operating the parking guide switch 6, the width W1 between the left vertical line 43a and the right vertical line 43a is displayed so as to become the width corresponding to the full width longer than the full length of the vehicle 1 by a predetermined value, as shown in FIG. 14B. The width W2 between the top horizontal line 43b and the bottom horizontal line 43b is displayed so as to become the width corresponding to the height of the vehicle 1 or the width corresponding to the width longer than the height of the vehicle 1 by a predetermined value as in parallel parking.

Figure 12C:
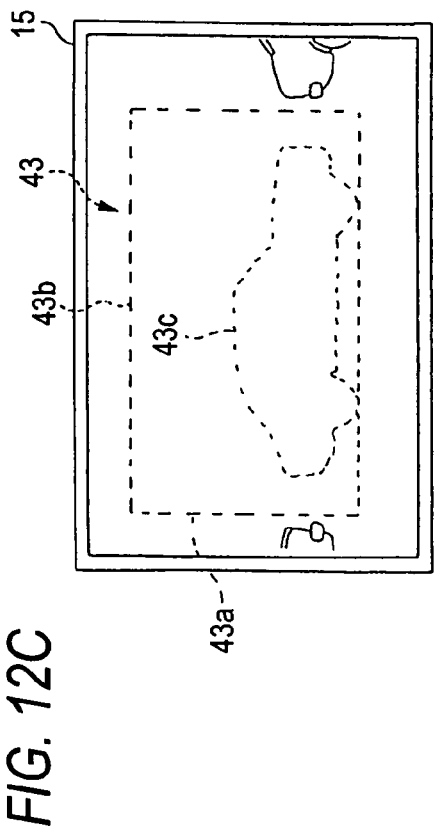
Figure 14C:
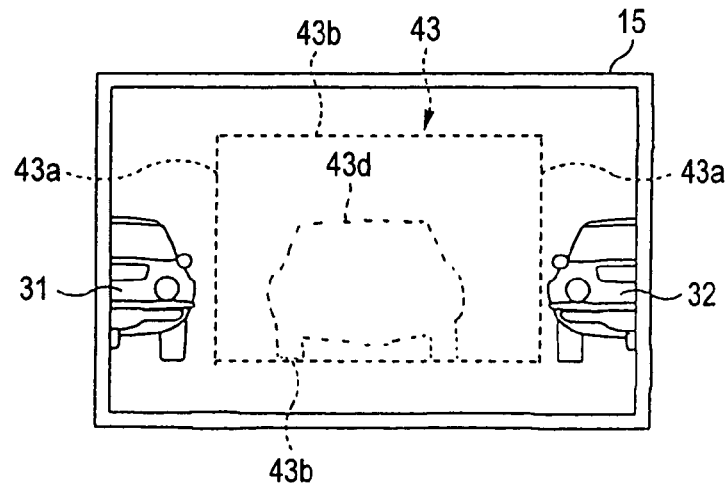

Indicators 43c (in parallel parking) and 43d (in back-in parking) schematically representing the vehicle 1 in parking may be additionally displayed as shown in FIGS. 12C and 14C. When the indicator 43c or 43d is displayed, the driver can easily recognize the position of the vehicle 1 at the completion of parking and can previously check on display 15 whether or not the vehicle 1 and its adjacent vehicle or obstacle are at proper positions at the completion of parking. The driver can use the indicator 43c or 43d to stop the vehicle 1 at the reference position. In the examples in FIGS. 12C and 14C, the vertical line 43a and the horizontal line 43b are displayed together with the indicators 43c and 43d that schematically represent the vehicle 1. However, it may possible to omit either or both of the vertical line 43a and the horizontal line 43b.

Since the indicators 43 are thus displayed on the display 15, if an obstacle such as a parked vehicle does not exist within the indicators 43 regardless of parallel parking or back-in parking, the driver can visually see that the space indicated by the indicators 43 contains an available space in which the vehicle 1 can be parked.

Since the parking assistance apparatus as the second embodiment of the invention is thus configured, parking assistance for parallel parking and back-in parking is performed according to the following procedures:

[2-A] Parking Assistance of Parallel Parking

Parking assistance of left parallel parking will be discussed with FIGS. 12A, 12B, 13A, 13B, and 16.

Figure 12A:
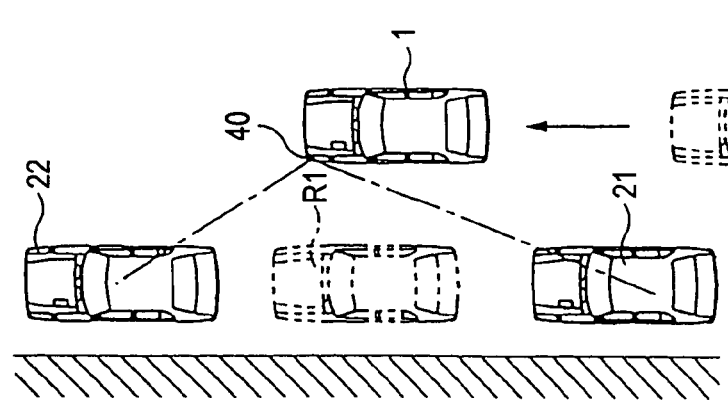
FIG. 12A is a plan view to describe parking assistance in parallel parking according to a second embodiment of the invention.
Figure 16:
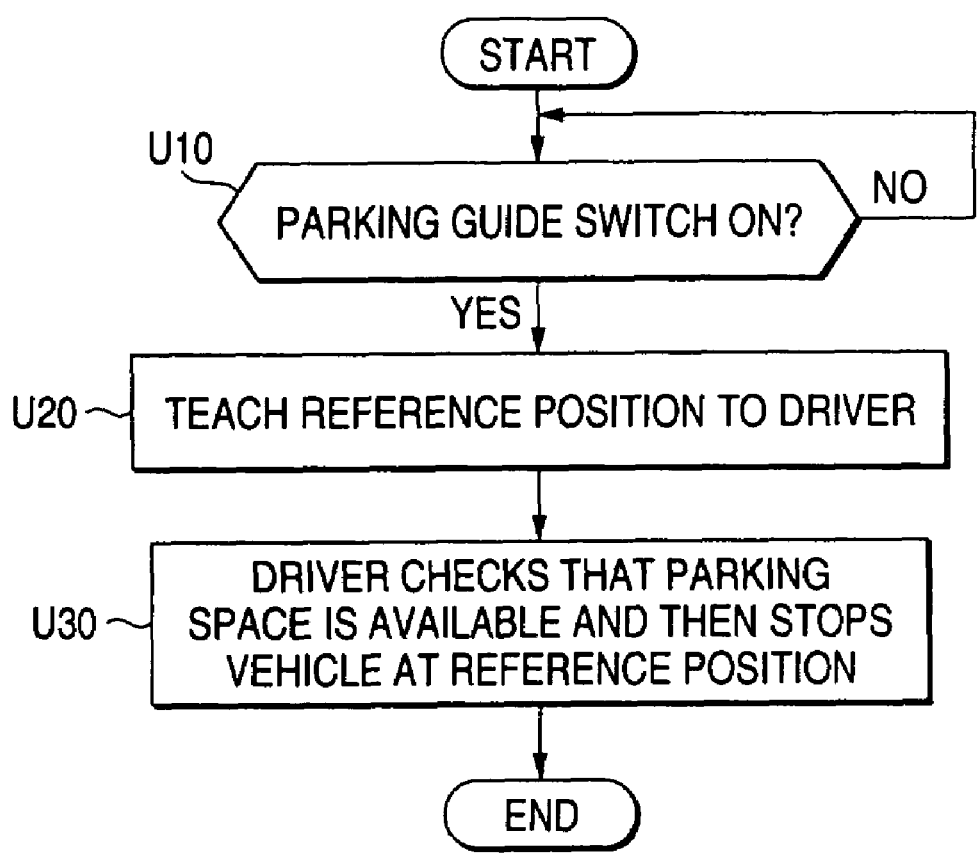
FIG. 16 is a flowchart to describe parking assistance in parallel parking and back-in parking according to the second embodiment of the invention.

As shown in FIG. 12A, to do left parallel parking when there are parked vehicles 21 and 22 at the upstream side and the downstream side of an area R1 for parking the vehicle 1, for example, first the driver turns on the parking guide switch 6 at the upstream right of the area R1 (position of the vehicle 1 indicated by dashed lines in FIG. 12A) to select "left parallel parking" (step U10 in FIG. 16).

When the driver turns on the parking guide switch 6, the image captured by a side view camera 40 and the indicators 43 for parallel parking are displayed on the display 15 in the vehicle compartment as shown in FIG. 12B, and a voice message of "check that a sufficient space is available to park your vehicle and then stop the vehicle at the position where the left line matches the rear end of the front vehicle while matching the bottom line in the screen with the tire ground contact positions of the front vehicle" is given to the driver (step U20 in FIG. 16).

While seeing the display 15, first the driver moves the vehicle 1 forward so that the right vertical line 43a may overlap the rear end of the vehicle 22 ahead the vehicle 1. When the right vertical line 43a overlaps the rear end of the front vehicle 22. The driver checks whether or not an obstacle such as a parked vehicle exists within the indicators 43.

At this time, if the driver determines that an obstacle exists within the indicators 43 and a sufficient space is not available, the driver turns off the parking guide switch 6 and terminates parking assistance.

If the driver determines that no obstacle exists within the indicators 43 and a sufficient space is available, the driver drives the vehicle 1 according to the voice message so that the bottom line (lower horizontal line) 43b on the display 15 may overlap tire ground contact positions 22a and 22a of the front vehicle 22 (see FIG. 13B) and that the left line (left vertical line) 43a overlaps the rear end of the vehicle 22.

Figure 13A:
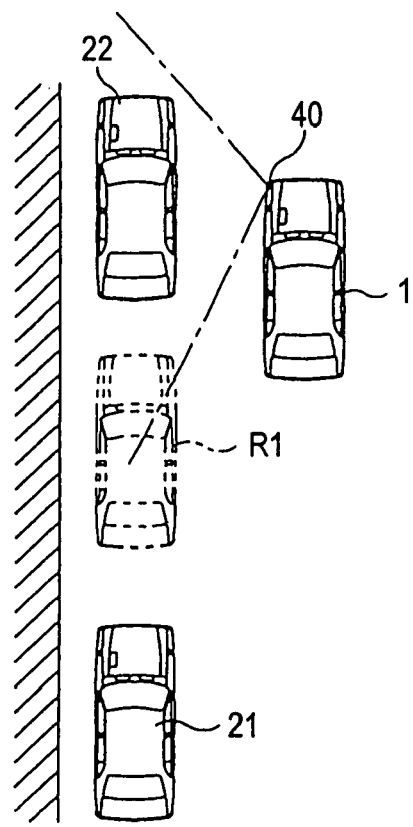
FIG. 13A is a plan view to describe parking assistance in parallel parking according to the second embodiment of the invention.
Figure 13B:
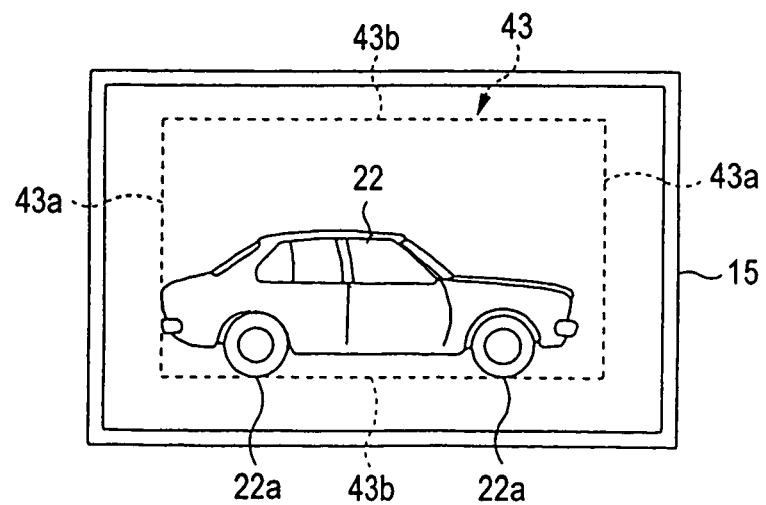
FIG. 13B is a schematic drawing to show a display screen displaying an image captured by the camera and indicators at the position of the vehicle shown in FIG. 13A.

That is, if the drivers stops the vehicle 1 at the position where the lower horizontal line 43*b* overlaps the tire ground contact positions 22*a* and 22*a* of the front vehicle 22 and the left vertical line 43*a* overlaps the rear end of the vehicle 22 on the display 15 as shown in FIG. 13B, the vehicle 1 is stopped at the position as shown in FIG. 13A (step U30 in FIG. 16). The vehicle stop position at this time is the reference position.

After stopping the vehicle-1 at the reference position, the driver again presses the parking guide switch 6, whereby the position at which the vehicle 1 exists at present is set as the reference position and the driver is guided through the path from the reference position to an initial vehicle stop position and further from the initial vehicle stop position to a target parking position as also described in the parking assistance for parallel parking in the first embodiment.

In the embodiment, the reference position differs from that of the first embodiment. Therefore necessary moving distance D1 from the reference position to the initial vehicle stop position in parallel parking assistance is set to a predetermined distance which is different from that of the first embodiment (for example, the necessary moving distance D1 is shorter than that of the first embodiment).

In the description given above, there are parked vehicles 21 and 22 at the upstream side and the downstream side of the area R1 for parking the vehicle 1; if there is only the parked vehicle 22 at the downstream side, the driver can stop the vehicle 1 at the reference position in a similar manner to that described above.

If there is only the parked vehicle 21 at the upstream side, the driver stops the vehicle 1 at a forward position of the full length of the vehicle 1 or more from the parked vehicle 21 and again presses the parking guide switch 6 at the vehicle stop position, whereby the position can be set as the reference position.

Further, if the parked vehicles 21 and 22 do not exist, the driver stops the vehicle 1 at a proper position by visual inspection and again presses the parking guide switch 6 at the vehicle stop position, whereby the position can be set as the reference position.

[2-B] Parking Assistance of Back-In Parking

Parking assistance of left back-in parking will be discussed with FIGS. 14A, 14B, 14C, 15A, 15B, and 16.

As shown in FIG. 14A, to do left back-in parking when there are parked vehicles 31 and 32 at the right (upstream side) and the left (back) of an area R2 for parking the vehicle 1, for example, first the driver turns on the parking guide switch 6 at the upstream right of the area R2 (position of the vehicle 1 indicated by dashed lines in FIG. 14A) to select "left back-in parking" (step U10 in FIG. 16).

When the driver turns on the parking guide switch 6, the image captured by a side view camera 40 and the indicators 43 for back-in parking are displayed on the display 15 in the vehicle compartment as shown in FIG. 14B, and a voice message of "check that a sufficient space is available to park your vehicle and then stop the vehicle at the position where the left line matches the right side face of the vehicle that is ahead of your vehicle while matching the bottom line in the screen with the tire ground contact positions of the vehicle" is given to the driver (step U20 in FIG. 16).

As shown in FIGS. 14A and 14B, while seeing the display 15, first the driver moves the vehicle 1 forward so that the right vertical line 43*a* may overlap the right side face of the vehicle 32 that is ahead the vehicle 1. When the right vertical line 43*a* overlaps the right side face of the vehicle 32, the driver checks whether or not an obstacle such as a parked vehicle exists within the indicators 43.

At this time, if the driver determines that an obstacle exists within the indicators 43 and a sufficient space is not available, the driver turns off the parking guide switch 6 and terminates parking assistance.

If the driver determines that no obstacle exists within the indicators 43 and a sufficient space is available, the driver drives the vehicle 1 according to the voice message so that the bottom line (lower horizontal line) 43*b* on the display 15 overlaps tire ground contact positions 32*a* and 32*a* of the vehicle 32 that is ahead of the vehicle 1 (see FIG. 15B) and that the left line (left vertical line) 43*a* may overlap the right side face of the vehicle 32.

Figure 15A:
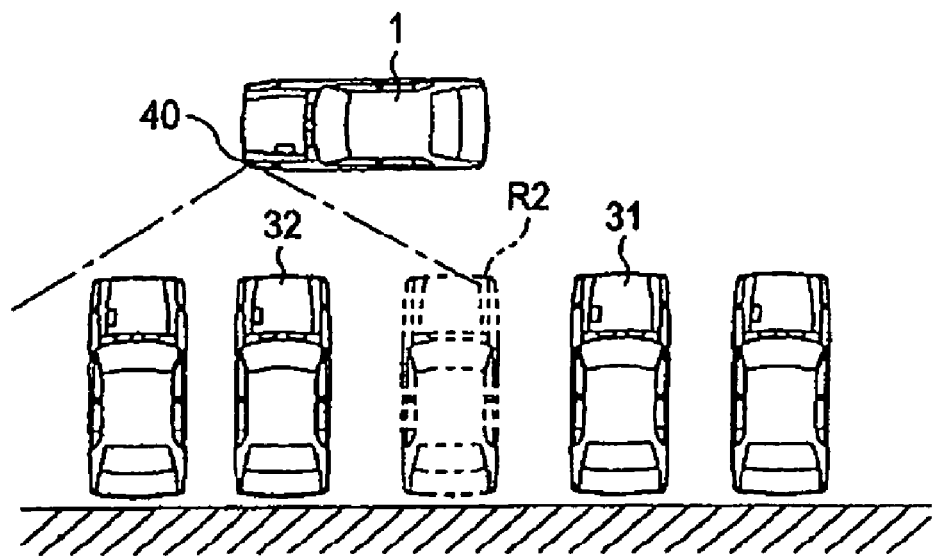
FIG. 15A is a plan view to describe parking assistance in back-in parking according to the second embodiment of the invention.
Figure 15B:
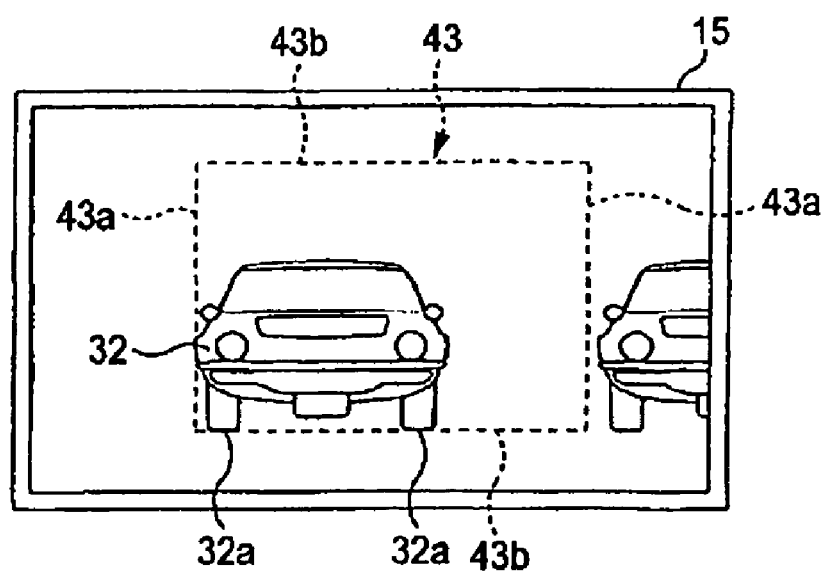
FIG. 15B is a schematic drawing to show a display screen displaying an image captured by the camera and indicators at the position of the vehicle 1 shown in FIG. 15A.

That is, if the drivers stops the vehicle 1 at the position where the lower horizontal line 43*b* overlaps the tire ground contact positions 32*a* and 32*a* of the vehicle 32 that is ahead of the vehicle 1 and the left vertical line 43*a* overlaps the right side face of the vehicle 32 on the display 15 as shown in FIG. 15B, the vehicle 1 is stopped at the position as shown in FIG. 15A (step U30 in FIG. 16). The vehicle stop position at this time is the reference position.

After stopping the vehicle 1 at the reference position, the driver again presses the parking guide switch 6, whereby the position at which the vehicle 1 exists at present is set as the reference position and the driver is guided through the path from the reference position to an initial vehicle stop position and further from the initial vehicle stop position to a target parking position as also described in the parking assistance for back-in parking in the first embodiment.

In the embodiment, the reference position differs from that of the first embodiment. Therefore necessary moving distance D2 from the reference position to the initial vehicle stop position in back-in parking assistance is set to a predetermined distance which is different from that of the first embodiment (for example, the necessary moving distance D2 is shorter than that of the first embodiment).

In the description given above, there are parked vehicles 31 and 32 at the upstream side and the downstream side of the area for parking the vehicle 1; if there is only the parked vehicle 32 at the downstream side, the driver can stop the vehicle 1 at the reference position in a similar manner to that described above.

If there is only the parked vehicle 31 at the upstream side, the driver stops the vehicle 1 at a forward position of the full width of the vehicle 1 or more from the parked vehicle 31 and again presses the parking guide switch 6 at the vehicle stop position, whereby the position can be set as the reference position.

Further, if the parked vehicles 31 and 32 do not exist, the driver stops the vehicle 1 at a proper position by visual inspection and again presses the parking guide switch 6 at the vehicle stop position, whereby the position can be set as the reference position.

When the driver uses the indicators 43*c* and 43*d* that schematically represents the parked state of the vehicle 1, taking parallel parking mode as an example, the driver matches the rear end of the indicator 43*c*, 43*d* with the rear end of the parked vehicle 22 instead of matching the left line with the rear end of the parked vehicle 22. In this case, the moving distance from the reference position to the initial vehicle stop position when the left line is used in the matching is adjusted to a short distance.

As described above, the parking assistance apparatus can provide similar advantages to those of the parking assistance apparatus as the first embodiment.

Further, when the driver starts parallel parking by operating the parking guide switch 6, two guidelines are displayed with a spacing corresponding to the full length of the vehicle 1, so that the driver can easily know whether or not a space to park the vehicle 1 is available by determining whether or not an obstacle such as a parked vehicle exists between the two guidelines. Accordingly, the driver understands that the vehicle 1 is hard to park in the area R1 for parking the vehicle 1, and can avoid difficult parking operation and can be guided so as to find out any other available parking space. Therefore, the parking assistance apparatus can assist the driver in parking more safely and more appropriately.

When the driver starts parallel parking by operating the parking guide switch 6, two guidelines are displayed with a spacing corresponding to the full width of the vehicle 1, so that the driver can easily know whether or not a space to park the vehicle 1 is available by determining whether or not an obstacle such as a parked vehicle exists between the two guidelines. Accordingly, the driver understands it hard to park in the area R2 for parking the vehicle 1, and can avoid difficult parking operation and can be guided so as to find out any other available parking space. Therefore, the parking assistance apparatus can assist the driver in parking more safely and more appropriately.

[3] Third Embodiment

Parts identical with those of the parking assistance apparatus of the first embodiment previously described with reference to the accompanying drawings are denoted by the same reference numerals in FIGS. 17 to 19.

The parking assistance apparatus of the third embodiment differs from that of the first embodiment in guide process to a reference position; it guides the driver to the reference position using a wheel speed sensor 4 for measuring the rotation speed of the vehicle 1 and moving distance estimation unit 9 for estimating the moving distance of the vehicle 1.

Figure 17A:
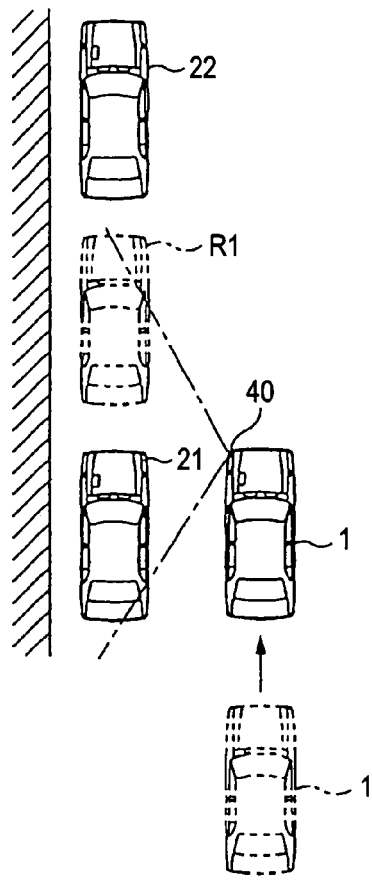
FIG. 17A is a plan view to describe parking assistance in parallel parking according to a third embodiment of the invention.
Figure 17B:
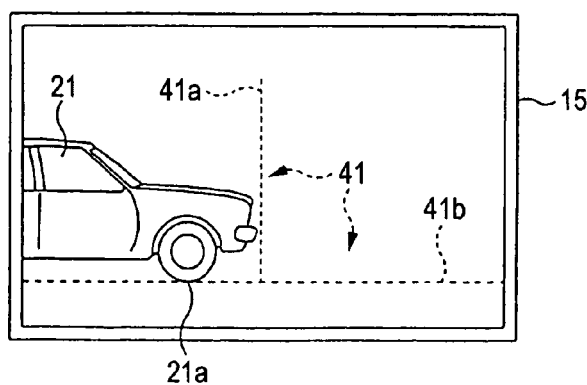
FIGS. 17B and 17C are schematic drawings to show a display screen displaying an image captured by a camera and indicators at the position of a vehicle shown in FIG. 17A.
Figure 18B:
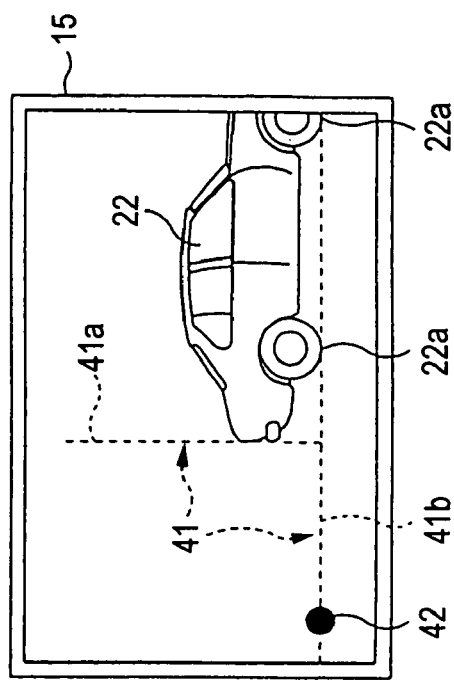
FIGS. 18B and 18C are schematic drawings to show a display screen displaying an image captured by the camera and indicators at the position of the vehicle shown in FIG. 18A.

That is, when there are parked vehicles 21 and 22 at the upstream side and the downstream side of an area R1 for parking the vehicle 1 in parallel parking, for example, as shown in FIG. 17A, the moving distance estimation unit 9 estimates the moving distance of the vehicle 1 when the vehicle 1 moves forward from the position where a vertical line 41a shown in FIG. 17B overlaps the front end of the parked vehicle 21 to the position where a vertical line 41a shown in FIG. 18B overlaps the rear end of the parked vehicle 22.

Figure 17C:
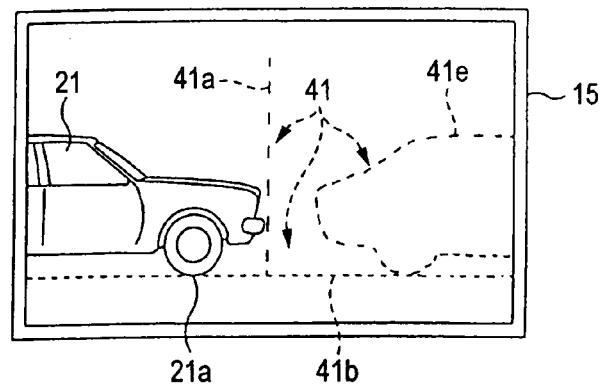
Figure 18C:
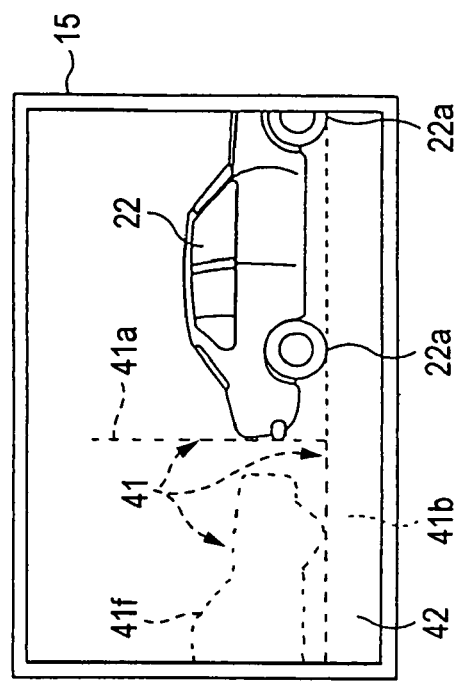

Indicators 41e and 41f schematically representing the parked state of the vehicle 1 in parking may be additionally displayed as shown in FIGS. 17C and 18C. When there are parked vehicles 21 and 22 at the upstream side and the downstream side of the area R1 for parking the vehicle 1 in parallel parking, the schematic indicators 41e and 41f is used in place of the vertical lines. The moving distance estimation unit 9 estimates the moving distance of the vehicle 1 when the vehicle 1 moves forward from the position where the schematic indicator 43e shown in FIG. 17C has a proper spacing from the front end of the parked vehicle 21 to the position where the schematic indicator 41f shown in FIG. 18C has a proper spacing from the rear end of the vehicle 22.

In back-in parking, indicators schematically representing the vehicle 1 in parking (not shown) may also be used in a similar manner to that described above.

Figure 18A:
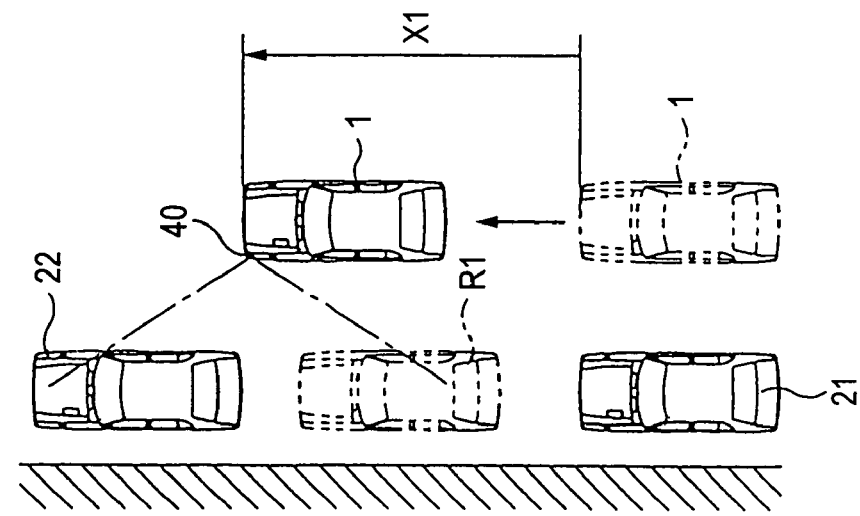
FIG. 18A is a plan view to describe parking assistance in parallel parking according to the third embodiment of the invention.

In the parking assistance apparatus, as the driver presses a parking guide switch 6 at the move start position of the vehicle 1 (namely, the position where the vertical line 41a shown in FIG. 17B overlaps the front end of the parked vehicle 21) and presses the parking guide switch 6 at the move end position of the vehicle 1 (namely, the position where the vertical line 41a shown in FIG. 18B overlaps the rear end of the parked vehicle 22), the move start and end positions of the vehicle 1 are determined and the moving distance estimation unit 9 estimates the moving distance of the vehicle 1 in this section. Therefore, if moving distance X1 of the vehicle 1 is larger than the full length of the vehicle 1 by a predetermined value or more as shown in FIG. 18A, the driver recognizes that the vehicle 1 can be parked in the available area R1 with a margin.

Figure 19A:
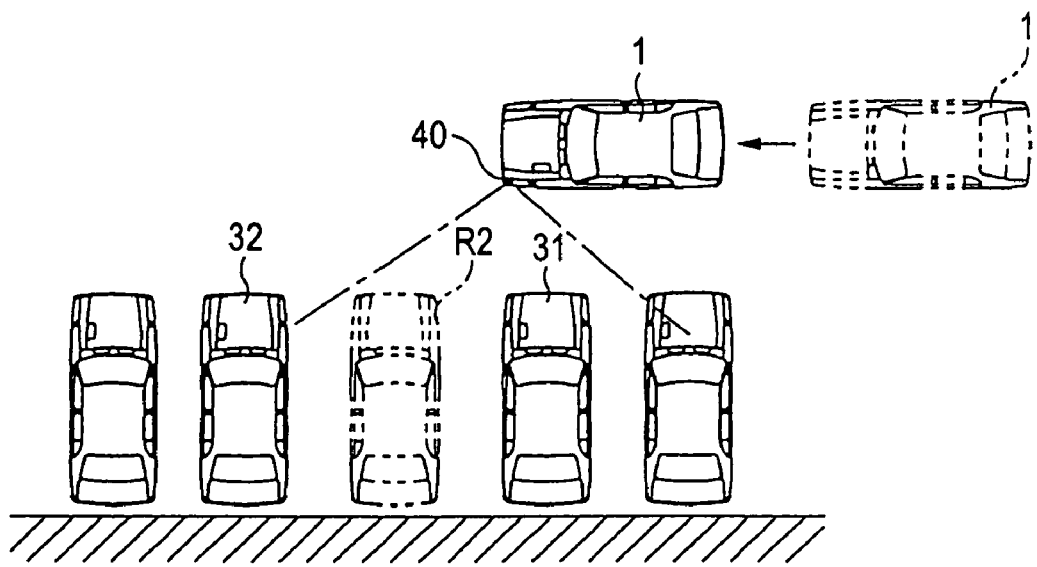
FIG. 19A is a plan view to describe parking assistance in back-in parking according to the third embodiment of the invention.
Figure 19B:
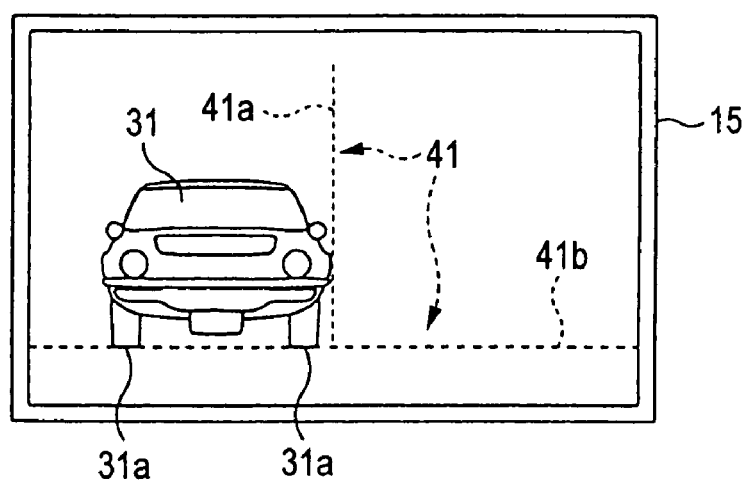
FIG. 19B is a schematic drawing to show a display screen displaying an image captured by the camera and indicators at the position of the vehicle shown in FIG. 19A.
Figure 20A:
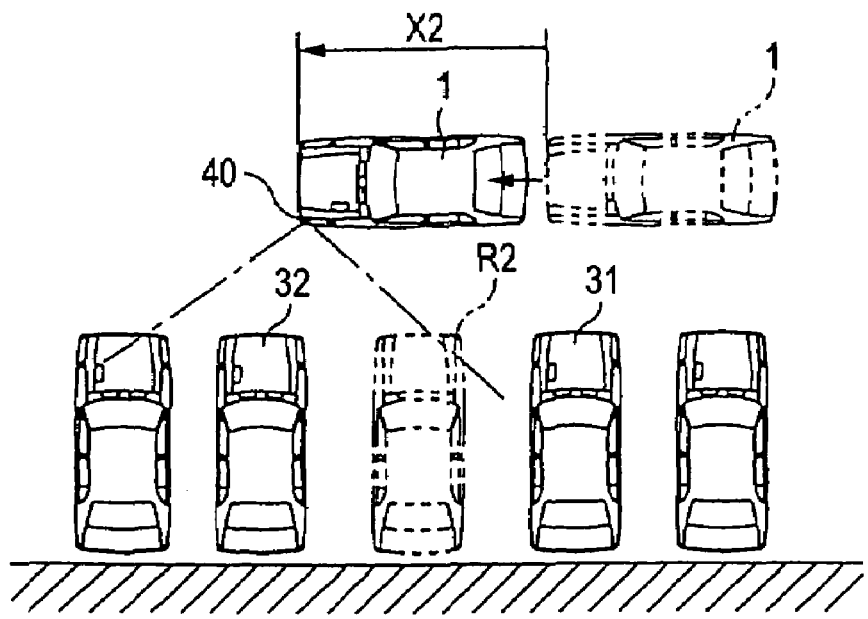
FIG. 20A is a plan view to describe parking assistance in back-in parking according to the third embodiment of the invention.
Figure 20B:
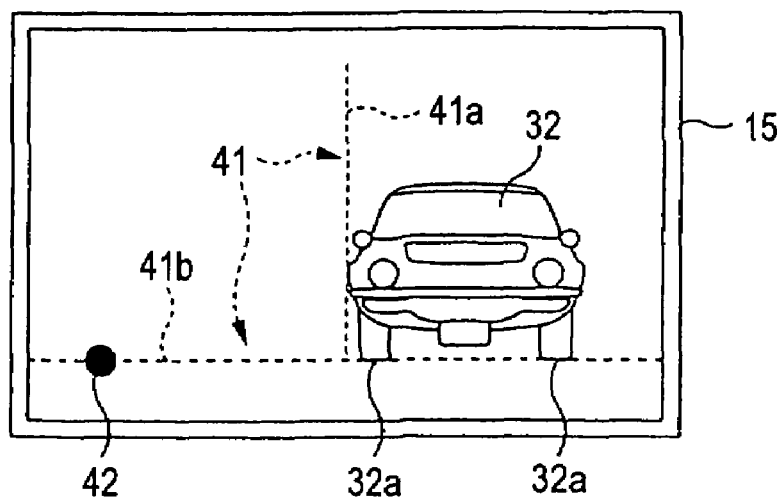
FIG. 20B is a schematic drawing to show a display screen displaying an image captured by the camera and indicators at the position of the vehicle shown in FIG. 20A.

When there are parked vehicles 31 and 32 at the upstream side (right) and the back (left) of an area R2 for parking the vehicle 1 in back-in parking, for example, as shown in FIG. 19A, the moving distance estimation unit 9 estimates the moving distance of the vehicle 1 when the vehicle 1 moves forward from the position where a vertical line 41a shown in FIG. 19B overlaps the left side face (left end) of the parked vehicle 31 to the position where a vertical line 41a shown in FIG. 20B overlaps the right side face (right end) of the parked vehicle 32.

In the parking assistance apparatus, as the driver presses the parking guide switch 6 at the move start position of the vehicle 1 (namely, the position where the vertical line 41a shown in FIG. 19B overlaps the left side face of the parked vehicle 31) and presses the parking guide switch 6 at the move end position of the vehicle 1 (namely, the position where the vertical line 41a shown in FIG. 20B overlaps the right side face of the parked vehicle 32), the move start and end positions of the vehicle 1 are determined and the moving distance estimation unit 9 estimates the moving distance of the vehicle 1 in this section. Therefore, if moving distance X2 of the vehicle 1 is longer than the full width of the vehicle 1 by a predetermined value or more as shown in. FIG. 20A, the driver recognizes that the vehicle 1 can be parked in the available area R2 with a margin.

Since the parking assistance apparatus in the third embodiment of the invention is thus configured, parking assistance for parallel parking and back-in parking is performed according to the following procedures:

[3-A] Parking Assistance of Parallel Parking

Parking assistance of left parallel parking will be discussed with FIGS. 17A, 17B, 17C, 18A, 18B, 18C and 21.

Figure 21:
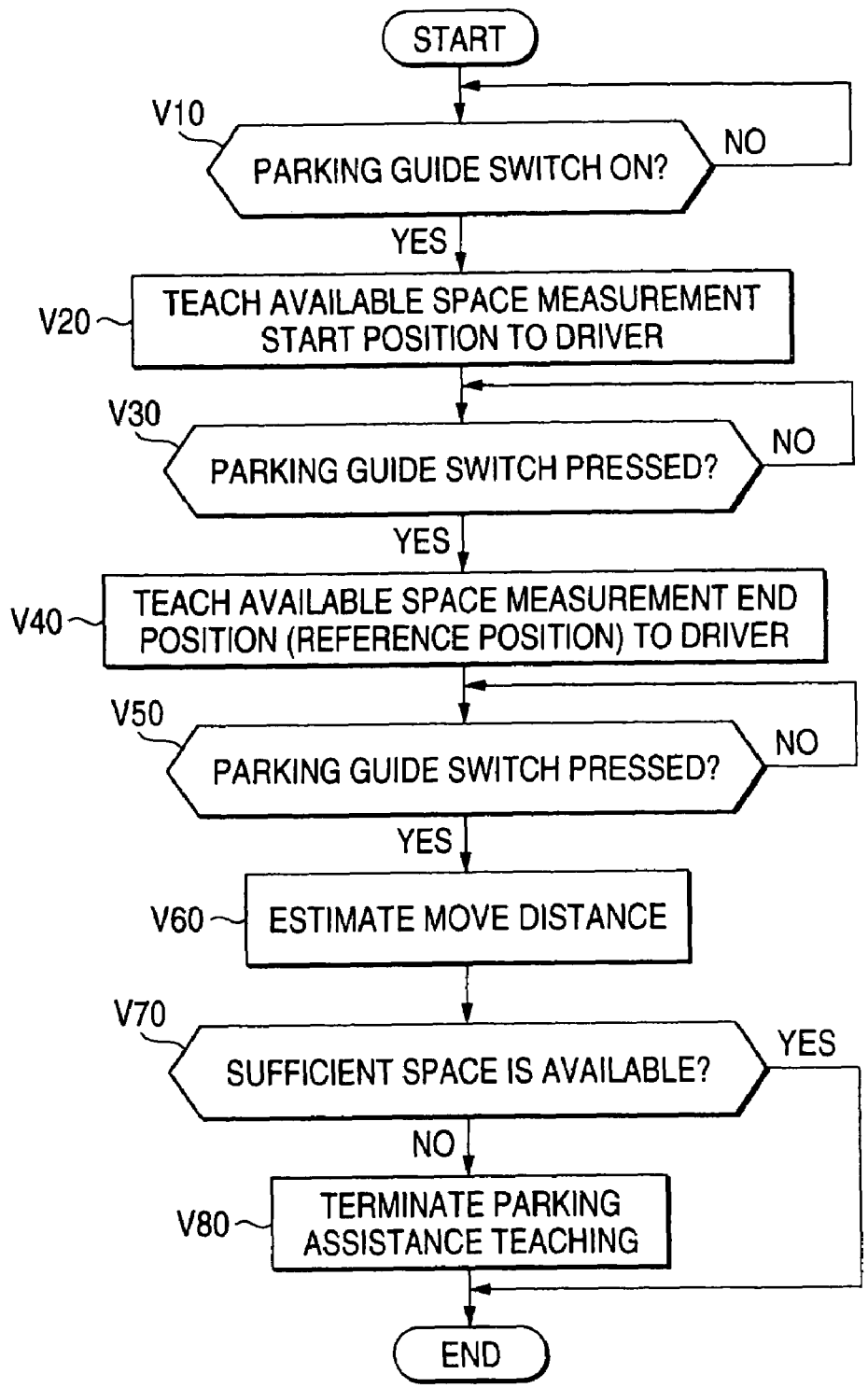
FIG. 21 is a flowchart to describe parking assistance in parallel parking and back-in parking according to the third embodiment of the invention.

As shown in FIG. 17A, to do left parallel parking when parked vehicles 21 and 22 exist at the upstream side and the downstream side of an area R1 for the driver to park the vehicle 1, for example, first the driver turns on the parking guide switch 6 at the upstream right of the area R1 for parking the vehicle 1 (position of the vehicle 1 indicated by dashed lines in FIG. 17A) to select "left parallel parking" (step V10 in FIG. 21).

When the driver turns on the parking guide switch 6, the image captured by a side view camera 40 and the indicators 41 for parallel parking are displayed on the display 15 in the vehicle compartment, and a voice message of "while matching the horizontal line in the screen with the tire ground contact position of the vehicle at the upstream side of the area, stop your vehicle at the position where the vertical line matches the front end of the vehicle at the upstream side and press the parking guide switch" is given to the driver (step V20 in FIG. 21).

Then, while seeing the display 15, the driver drives the vehicle 1 so that the horizontal line 41b may overlap the tire ground contact position 21a of the parked vehicle 21 and that the vertical line 41a may overlap the front end of the parked vehicle 21 as shown in FIGS. 17A and 17B. When the horizontal line 41b overlaps the tire ground contact position 21a of the parked vehicle 21 and the vertical line 41a overlaps the front end of the parked vehicle 21, the driver presses the parking guide switch 6 (V30 in FIG. 21).

After this, a voice message of "while matching the horizontal line in the screen with the tire ground contact positions of the front vehicle, stop your vehicle at the position where the vertical line matches the front end of the front vehicle and press the parking guide switch" is given to the driver (step V40 in FIG. 21).

Then, while seeing the display 15, the driver drives the vehicle 1 so that the horizontal line 41b overlaps the tire ground contact positions 22a and 22a of the parked vehicle 22 and that the vertical line 41a may overlap the rear end of the parked vehicle 22 as shown in FIGS. 18A and 18B. When the horizontal line 41b overlaps the tire ground contact positions 22a and 22a of the parked vehicle 22 and the vertical line 41a overlaps the rear end of the parked vehicle 22, the driver presses the parking guide switch 6 (V50 in FIG. 21).

When the driver uses the indicators 41e and 41f that schematically represent the parked state of the vehicle 1, the driver matches the rear end of the indicator 41e with the front end of the vehicle 21 or the front end of the indicator 41f with the rear end of the vehicle 22 with a predetermined spacing in between instead of matching the vertical line 41a with the rear end of the vehicle 21 or 22.

When the parking guide switch 6 is pressed, the moving distance estimation unit 9 estimates the moving distance X1 of the vehicle 1 (V60 in FIG. 21).

Whether or not the moving distance X1 estimated by the moving distance estimation unit 9 is a predetermined value or more (namely, whether or not a sufficient space to park the vehicle 1 is available) is determined (V70 in FIG. 21).

If it is determined that a sufficient space is not available, a voice message of "sufficient space to park your vehicle is not available" is output, telling the driver that parking assistance is terminated.

If it is determined that a sufficient space is available, the position at which the vehicle 1 stops at present is set as the reference position. As described in the parallel parking assistance in the first embodiment, the position of the vehicle 1 at present is set as the reference position and the driver is guided through the path from the reference position to an initial vehicle stop position and further from the initial vehicle stop position to a target parking position.

In the embodiment, the reference position differs from that of the first embodiment and therefore necessary moving distance D1 from the reference position to the initial vehicle stop position in parallel parking assistance is set to a predetermined distance different from that of the first embodiment.

In the description given above, there are parked vehicles 21 and 22 at the upstream side and the downstream side of the area R1 for parking the vehicle 1; if there is only the parked vehicle 22, to start parking assistance, the driver presses the parking guide switch 6 twice and then stops the vehicle 1 at the position where the vertical line 41a overlaps the rear end of the parked vehicle 22 and again presses the parking guide switch 6 at the vehicle stop position, whereby the position can be set as the reference position.

If there is only the parked vehicle 21, the driver presses the parking guide switch 6 when the driver starts parking assistance. Then, the driver moves the vehicle 1 forward and stops the vehicle 1 at a forward position of the full length of the vehicle 1 or more from the parked vehicle 21 and presses the parking guide switch 6 twice at the vehicle stop position.

Further, if the parked vehicles 21 and 22 do not exist, the driver presses the parking guide switch 6 twice when the driver starts parking assistance. Then the driver moves the vehicle 1 forward and stops the vehicle 1 at a proper position and presses the parking guide switch 6 once more at the vehicle stop position, whereby the position can be set as the reference position.

[3-B] Parking Assistance of Back-In Parking

Parking assistance of left back-in parking will be discussed with FIGS. 19A, 19B, 20A, 20B, and 21.

As shown in FIG. 19A, to do left back-in parking when there are parked vehicles 31 and 32 at the upstream side (right) and the back (left) of an area R2 for parking the vehicle 1, for example, first the driver turns on the parking guide switch 6 at the upstream right of the area R2 (position of the vehicle 1 indicated by dashed lines in FIG. 19A) to select "left back-in parking" (step V10 in FIG. 21).

When the driver turns on the parking guide switch 6, the image captured by the side view camera 40 and the indicators 41 for back-in parking are displayed on the display 15 in the vehicle compartment, and a voice message of "while matching the horizontal line in the screen with the tire ground contact positions of the vehicle at the upstream side of the area, stop your vehicle at the position where the vertical line matches the left side face of the vehicle at the upstream side and press the parking guide switch" is given to the driver (step V20 in FIG. 21).

Then, while seeing the display 15, the driver drives the vehicle 1 so that the horizontal line 41b may overlap the tire ground contact positions 31a and 31a of the parked vehicle 31 and that the vertical line 41a overlaps the left side face (left end) of the parked vehicle 31 as shown in FIGS. 19A and 19B. When the horizontal line 41b overlaps the tire ground contact positions 31a and 31a of the parked vehicle 31 and the vertical line 41a overlaps the left end of the parked vehicle 31, the driver presses the parking guide switch 6 (V30 in FIG. 21).

After this, a voice message of "while matching the horizontal line in the screen with the tire ground contact positions of the vehicle that is ahead of your vehicle, stop your vehicle at the position where the vertical line matches the right side face of the vehicle and press the parking guide switch" is given to the driver (step V40 in FIG. 21).

Then, while seeing the display 15, the driver drives the vehicle 1 so that the horizontal line 41b overlaps the tire ground contact positions 32a and 32a of the parked vehicle 32 and that the vertical line 41a overlaps the right side face (right end) of the parked vehicle 32 as shown in FIGS. 20A and 20B. When the horizontal line 41b overlaps the tire ground contact positions 32a and 32a of the parked vehicle 32 and the vertical line 41a overlaps the right end of the parked vehicle 32, the driver presses the parking guide switch 6 (V50 in FIG. 21).

When the parking guide switch 6 is pressed, the moving distance estimation unit 9 estimates the moving distance X2 of the vehicle 1 (V60 in FIG. 21).

Whether or not the moving distance X2 estimated by the moving distance estimation unit 9 is a predetermined value or more (namely, whether or not a sufficient space to park the vehicle 1 is available) is determined (V70 in FIG. 21).

If it is determined that a sufficient space is not available, a voice message of "sufficient space to park your vehicle is not available" is output, telling the driver that parking assistance is terminated (V80 in FIG. 21).

If it is determined that a sufficient space is available, the position at which the vehicle 1 stops at present is set as the reference position. As described in the back-in parking assistance in the first embodiment, the position of the vehicle 1 at present is set as the reference position and the driver is guided through the path from the reference position to an initial vehicle stop position and further from the initial vehicle stop position to a target parking position.

In the embodiment, the reference position differs from that of the first embodiment and therefore necessary moving distance D2 from the reference position to the initial vehicle stop position in back-in parking assistance is set to a predetermined distance different from that of the first embodiment.

In the description given above, there are parked vehicles 31 and 32 at the upstream side and the downstream side of the area R2 for parking the vehicle 1; if there is only the parked vehicle 32, to start parking assistance, the driver presses the parking guide switch 6 twice and then stops the vehicle 1 at the position where the vertical line 41a overlaps the right side face (right end) of the parked vehicle 32 and again presses the parking guide switch 6 at the vehicle stop position, whereby the position can be set as the reference position.

If there is only the parked vehicle 31, to start parking assistance, the driver presses the parking guide switch 6 and then stops the vehicle 1 at a forward position of the full width of the vehicle 1 or more from the parked vehicle 31 and presses the parking guide switch 6 twice at the vehicle stop position, whereby the position can be set as the reference position.

Further, if the parked vehicles 31 and 32 do not exist, to start parking assistance, the driver presses the parking guide switch 6 twice and then stops the vehicle 1 at a proper position and presses the parking guide switch 6 once more at the vehicle stop position, whereby the position can be set as the reference position.

As described above, the parking assistance apparatus can provide similar advantages to those of the parking assistance apparatus as the first embodiment.

Further, if there are parked vehicles at the downstream side and the upstream side of the area for parking the vehicle 1, the driver can easily know whether or not an available space to park the vehicle 1 exists between the two parked vehicles. Accordingly, the driver understands that the vehicle 1 is hard to park in the area, and can avoid difficult parking operation and can be guided so as to find out any other available parking space. Therefore, the parking assistance apparatus can assist the driver in parking more safely and more appropriately.

[4] Others

It should be understood that the present invention is not limited to the embodiment disclosed, but various variations of the above described embodiment may be possible without departing from the spirits of the present invention, including variations as described below, for example.

The vertical line and the horizontal line of the indicators 41 may be displayed in different colors. Accordingly, easier-to-understand assistance can be provided for the driver.

A yaw rate sensor (not shown) may be provided in place of the moving distance estimation unit 9 and the steering wheel angle sensor 3. In this case, the detection values of the yaw rate sensor is integrated and the yaw angle of the vehicle 1 is calculated, and the moving distance is estimated.

In the description of the embodiments, the transmission 19 is multistage transmission, and the shift position control unit 12 limits the shift stage to the first gear. However, it may be possible to use the continuously variable transmission. In this case, the shift position control unit 12 limits the transmission gear ratio at low range corresponding to a lower gear.

What is claimed is:

1. A parking assistance apparatus for assisting a driver to park a vehicle at a target parking position, the parking assistance apparatus comprising:
    at least one camera for mounting on the vehicle to enable capturing of an image from a right side or left side of the vehicle;
    an image display unit for displaying the image captured by the camera;
    an image information control unit for controlling image information on the image display unit,
    an instruction unit that gives a start instruction of the parking assistance,
    wherein the image information control unit provides superimpose indicators on the image for guiding the vehicle to a reference position at which the target parking position is viewable laterally of the vehicle,
    wherein at the reference position at least one of the superimpose indicators is superimposed on an image of a vehicle parked adjacent to the target parking position captured by the camera, and
    wherein the image information control unit superimposes the superimpose indicators on the image on the image display unit when the instruction unit gives a start instruction of the parking assistance.

2. The parking assistance apparatus as claimed in claim 1, wherein the instruction unit enables the driver to select at least one of the left direction and the right direction from the vehicle as the direction of the target parking position and to give a start instruction of parking operation;
    wherein when the instruction unit gives a start instruction of parking operation on the left direction from the, the image information control unit displays an image from the left side of the vehicle on the image display unit; and
    wherein when the instruction unit gives a start instruction of parking operation on the right direction from the vehicle, the image information control unit displays an image from the right side of the vehicle on the image display unit.

3. The parking assistance apparatus as claimed in claim 1, wherein the superimpose indicators include a longitudinal direction guideline for positioning the vehicle in the longitudinal direction thereof and a lateral direction guideline for positioning the vehicle in the lateral direction thereof.

4. The parking assistance apparatus as claimed in claim 3, wherein the instruction unit gives a start instruction of parking operation when one of parallel parking and back-in parking is selected;
    wherein the lateral direction guideline includes a lateral direction guideline for parallel parking and a lateral direction guideline for back-in parking;
    wherein when the instruction unit gives a start instruction of parallel parking, the image information control unit superimposes the lateral direction guideline for parallel parking on the image; and
    wherein when the instruction unit gives a start instruction of back-in parking, the image information control unit superimposes the lateral direction guideline for back-in parking on the image.

5. The parking assistance apparatus as claimed in claim 3, wherein the longitudinal direction guideline includes two guidelines spaced from each other at an interval corresponding to the full length of the vehicle; and
    wherein when the instruction unit gives a start instruction of parallel parking, the image information control unit displays the two guidelines on the image.

6. The parking assistance apparatus as claimed in claim 3, wherein the longitudinal direction guideline includes two guidelines spaced from each other at the interval corresponding to the full width of the vehicle; and
    wherein when the instruction unit gives a start instruction of back-in parking, the image information control unit displays the two guidelines on the image.

7. The parking assistance apparatus as claimed in claim 1, wherein at least one of the superimpose indicators is a mark to schematically indicate the vehicle position at the completion of parking.

8. The parking assistance apparatus as claimed in claim 1, wherein the at least one camera includes a pair of front right and front left cameras for mounting on the front of the vehicle to enable capturing of an image from the front-right side and the front-left side of the vehicle.

9. A parking assistance apparatus for assisting a driver to once stop a vehicle at a predetermined reference position where the driver can view a target parking position in a lateral direction of the vehicle and then to perform parking operation from the reference position to the target parking position, the parking assistance apparatus comprising:
- a camera for mounting on the front of the vehicle and for capturing an image from a side of the vehicle;
- an image display unit for display the image captured by the camera to the driver and
- an image information control unit for controlling image information on the image display unit,
- wherein the image information control unit provides superimpose indicators to guide the vehicle to a reference position on the image,
- wherein the superimpose indicators include a longitudinal direction guideline for positioning the vehicle in the longitudinal direction thereof and a lateral direction guideline for positioning the vehicle in the lateral direction thereof, and
- wherein the image information control unit displays a mark indicating a center position of the vehicle at the completion of parking on the lateral direction guideline.

10. A parking assistance method for assisting a driver to park a vehicle at a target parking position, the parking assistance method comprising:
- capturing an image viewed from a right side or left side of the vehicle; and
- displaying the captured image and superimpose indicators on the captured image to guide the vehicle to a reference position at which the target parking position is viewable laterally of the vehicle,
- wherein at the reference position at least one of the superimpose indicators is superimposed on the captured image of a vehicle parked adjacent to the target parking position.

11. The parking assistance method as claimed in claim 10, wherein the image is captured with either a front right camera or a front left camera mounted on the front of the vehicle to enable capturing of an image from the front-right side or the front-left side of the vehicle.

12. The parking assistance method as claimed in claim 10, wherein the image information control unit displays a mark that indicates a center position of the vehicle at the completion of parking.

13. A vehicle comprising:
- a parking assistance apparatus for assisting a driver to park the vehicle at a target parking position, the parking assistance apparatus including:
  - at least one camera installed on the vehicle for capturing an image from a right side or left side of the vehicle;
  - an image display unit for displaying the image captured by the camera; and
  - an image information control unit for controlling image information on the image display unit,
  - wherein the image information control unit provides superimpose indicators on the image display unit to guide the vehicle to a reference position at which the target parking position is viewable laterally of the vehicle,
  - wherein at the reference position at least one of the superimpose indicators is superimposed on an image of a vehicle parked adjacent to the target parking position captured by the camera.

14. The vehicle as claimed in claim 13, wherein the at least one camera includes a pair of front right and front left cameras mounted on the front of the vehicle to enable capturing of an image from the front-right side and the front-left side of the vehicle.

15. The vehicle as claimed in claim 13, wherein the image information control unit displays a mark that indicates a center position of the vehicle at the completion of parking.

16. A parking assistance apparatus for assisting a driver to park a vehicle at a target parking position, the parking assistance apparatus comprising:
- at least one camera for mounting on the vehicle to enable capturing of an image from a right side or left side of the vehicle;
- an image display unit for displaying the image captured by the camera; and
- an image information control unit for controlling image information on the image display unit,
- wherein the image information control unit provides superimpose indicators on the image for guiding the vehicle to a reference position at which the target parking position is viewable laterally of the vehicle,
- wherein at the reference position at least one of the superimpose indicators is superimposed on an image of a vehicle parked adjacent to the target parking position captured by the camera, and
- wherein the image information control unit displays a mark that indicates a center position of the vehicle at the completion of parking.

* * * * *